United States Patent
Akiyama

(10) Patent No.: US 11,460,764 B2
(45) Date of Patent: Oct. 4, 2022

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/476,226

(22) Filed: Sep. 15, 2021

(65) Prior Publication Data

US 2022/0082920 A1 Mar. 17, 2022

(30) Foreign Application Priority Data

Sep. 16, 2020 (JP) .............................. JP2020-155378

(51) Int. Cl.
| | |
|---|---|
| *G03B 21/20* | (2006.01) |
| *G02F 1/1335* | (2006.01) |
| *G03B 33/12* | (2006.01) |
| *G02B 27/28* | (2006.01) |
| *G02B 5/30* | (2006.01) |
| *H04N 9/31* | (2006.01) |
| *G02B 27/14* | (2006.01) |

(52) U.S. Cl.
CPC ....... *G03B 21/2073* (2013.01); *G02B 5/3083* (2013.01); *G02B 27/141* (2013.01); *G02B 27/283* (2013.01); *G02F 1/133526* (2013.01); *G03B 21/204* (2013.01); *G03B 21/208* (2013.01); *G03B 21/2013* (2013.01); *H04N 9/3161* (2013.01); *H04N 9/3164* (2013.01); *H04N 9/3167* (2013.01)

(58) Field of Classification Search
CPC .............. G03B 21/204; G03B 21/2073; G03B 21/208; G03B 21/2013; G02B 5/3083; G02B 27/283
USPC .......................................................... 353/20
See application file for complete search history.

(56) References Cited

U.S. PATENT DOCUMENTS

| | | |
|---|---|---|
| 5,161,042 A | 11/1992 | Hamada |
| 10,444,611 B2 * | 10/2019 | Pan ...................... G03B 21/204 |
| 10,915,014 B1 | 2/2021 | Akiyama |

(Continued)

FOREIGN PATENT DOCUMENTS

| | | |
|---|---|---|
| JP | H04-060538 A | 2/1992 |
| JP | 2005-321502 A | 11/2005 |

(Continued)

*Primary Examiner* — Jerry L Brooks
(74) *Attorney, Agent, or Firm* — Oliff PLC

(57) ABSTRACT

A light source apparatus according to the present disclosure includes a first light source section that outputs first light, a second light source section that outputs second light, a first polarization separator that transmits the first light and the second light polarized in a first polarization direction and reflects the first light polarized in a second polarization direction, a second polarization separator that reflects the first light polarized in the first polarization direction, a first diffusion element that diffuses the first light incident from the first polarization separator, a wavelength converter that converts in terms of wavelength the first light and emits third light, and a second diffusion element that diffuses the second light incident from the second polarization separator.

17 Claims, 13 Drawing Sheets

(56) References Cited

U.S. PATENT DOCUMENTS

| | | |
|---|---|---|
| 2005/0248736 A1 | 11/2005 | Itoh |
| 2008/0062386 A1 | 3/2008 | Ito |
| 2013/0027670 A1 | 1/2013 | Akiyama et al. |
| 2018/0252992 A1* | 9/2018 | Akiyama .............. G03B 21/204 |
| 2020/0201155 A1 | 6/2020 | Akiyama |
| 2020/0249555 A1 | 8/2020 | Akiyama |
| 2020/0252589 A1 | 8/2020 | Akiyama |
| 2020/0314397 A1 | 10/2020 | Akiyama |

FOREIGN PATENT DOCUMENTS

| | | |
|---|---|---|
| JP | 2008-065250 A | 3/2008 |
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2017-147420 A | 8/2017 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |

\* cited by examiner

LIGHT SOURCE APPARATUS AND PROJECTOR

The present application is based on, and claims priority from JP Application Serial Number 2020-155378, filed Sep. 16, 2020, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-4-60538 discloses a projection-type color image display apparatus including a light source, a plurality of dichroic mirrors, a liquid crystal display device including a microlens array, and a projection lens. The projection-type color image display apparatus separates white light outputted from the light source into a plurality of color luminous fluxes different in color from one another and performs color display operation by causing the plurality of separated color luminous fluxes to be incident on different sub-pixels in the single liquid crystal display device.

In the projection-type color image display apparatus described above, a red light reflecting dichroic mirror, a green light reflecting dichroic mirror, and a blue light reflecting dichroic mirror are arranged so as to be nonparallel to one another along the optical axis along which the white light outputted from the light source is incident. The white light outputted from the light source passes through the dichroic mirrors described above, which separate the white light into red light, green light, and blue light that travel in directions different from one another. The red light, the green light, and the blue light are incident on red sub-pixels, green sub-pixels, and blue sub-pixels of a light modulation device, respectively, with the red light, the green light, and the blue light spatially separated from one another by the microlenses provided on the light incident side of the light modulation device.

In the projection-type color image display apparatus disclosed in JP-A-4-60538, a lamp light source, such as a halogen lamp or a xenon lamp, is used as the white light source, and the liquid crystal display device is used as the light modulation device. The light outputted from the lamp light source is unpolarized light, and when the liquid crystal display device is used as the light modulation device, the light incident on the liquid crystal display device needs to be linearly polarized light polarized in a specific direction. On the other hand, to uniformly illuminate the liquid crystal display device, it is conceivable to provide, between the white light source and the liquid crystal display device, a pair of multi-lens arrays that divide the light incident thereon into a plurality of sub-luminous fluxes and a polarization converter that aligns the polarization directions of the plurality of sub-luminous fluxes with one another. In this case, a polarization converter including the following sections is used in many cases: a plurality of polarization separation layers and a plurality of reflection layers alternately arranged along the direction intersecting the light incident direction and a retardation layer provided in the optical path of the light having passed through the polarization separation layers or the optical path of the light reflected off the reflection layers.

However, when the size of the projection-type color image display apparatus described above is reduced to meet the recent demand for size reduction, it is difficult to manufacture a polarization converter formed of the polarization separation layers and the reflection layers arranged at small intervals. It is therefore difficult to reduce the size of a light source apparatus including a polarization converter of this type and in turn the size of a projector including the light source apparatus. In view of the problems described above, there is a need to provide a light source apparatus capable of outputting a plurality of color luminous fluxes polarized in an aligned direction without use of a small-interval polarization converter.

SUMMARY

To solve the problems described above, according to an aspect of the present disclosure, there is provided a light source apparatus including a light source section that outputs first light having a first wavelength band and containing light polarized in a first polarization direction and light polarized in a second polarization direction different from the first polarization direction and second light having a second wavelength band different from the first wavelength band, a first polarization separator that transmits in a first direction the first light polarized in the first polarization direction and incident from the light source section along the first direction, reflects in a second direction intersecting the first direction the first light polarized in the second polarization direction and incident from the light source section along the first direction, and transmits in the first direction the second light incident from the light source section along the first direction, a second polarization separator that is disposed in a position shifted in the first direction from the first polarization separator, reflects in the second direction the first light polarized in the first polarization direction and incident from the first polarization separator along the first direction, and transmits in the first direction the second light incident from the first polarization separator along the first direction, a first diffusion element that is disposed in a position shifted in the second direction from the first polarization separator, diffuses the first light incident from the first polarization separator along the second direction, and emits the diffused first light in a third direction opposite the second direction, a wavelength converter that is disposed in a position shifted in the second direction from the second polarization separator, converts in terms of wavelength the first light incident from the second polarization separator along the second direction, and emits third light having a third wavelength band different from the first and second wavelength bands in the third direction, and a second diffusion element that is disposed in a position shifted in the first direction from the second polarization separator, diffuses the second light incident from the second polarization separator along the first direction, and emits the diffused second light in a fourth direction opposite the first direction. The second polarization separator receives the third light from the wavelength converter along the third direction, transmits in the third direction the third light polarized in the first polarization direction, and reflects in the fourth direction the third light polarized in the second polarization direction. The first polarization separator transmits in the third direction the first light emitted from the first diffusion element along the third direction and reflects in the third direction the third light polarized in the second polarization direction and incident from the second polarization separator along the fourth direction. The second polarization separator reflects in the third direction the second light emitted from the second diffusion element along the fourth direction.

According to another aspect of the present disclosure, there is provided a light source apparatus including a light source section that outputs first light having a first wavelength band and containing light polarized in a first polarization direction and light polarized in a second polarization direction different from the first polarization direction and second light having a second wavelength band different from the first wavelength band, a first polarization separator that transmits in a first direction the first light incident from the light source section along the first direction and reflects in a second direction intersecting the first direction the second light incident from the light source section along the first direction, a second polarization separator that is disposed in a position shifted in the first direction from the first polarization separator, transmits in the first direction the first light polarized in the first polarization direction and incident from the first polarization separator along the first direction, and reflects in the second direction the first light polarized in the second polarization direction and incident from the first polarization separator along the first direction, a wavelength converter that is disposed in a position shifted in the second direction from the second polarization separator, converts in terms of wavelength the first light polarized in the second polarization direction and incident from the second polarization separator along the second direction, and emits in a third direction opposite the second direction third light having a third wavelength band different from the first and second wavelength bands, a first diffusion element that is disposed in a position shifted in the first direction from the second polarization separator, diffuses the first light incident from the second polarization separator along the first direction, and emits the diffused first light in a fourth direction opposite the first direction, and a second diffusion element that is disposed in a position shifted in the second direction from the first polarization separator, diffuses the second light incident from the first polarization separator along the second direction, and emits the diffused second light in the third direction. The second polarization separator receives the third light from the wavelength converter along the third direction, transmits in the third direction the third light polarized in the first polarization direction, and reflects in the fourth direction the third light polarized in the second polarization direction. The first polarization separator transmits in the third direction the second light emitted from the second diffusion element along the third direction and reflects in the third direction the third light polarized in the second polarization direction and incident from the second polarization separator along the fourth direction. The second polarization separator reflects in the third direction the first light emitted from the first diffusion element along the fourth direction.

According to another aspect of the present disclosure, there is provided a projector including the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 10.

Figure 1:
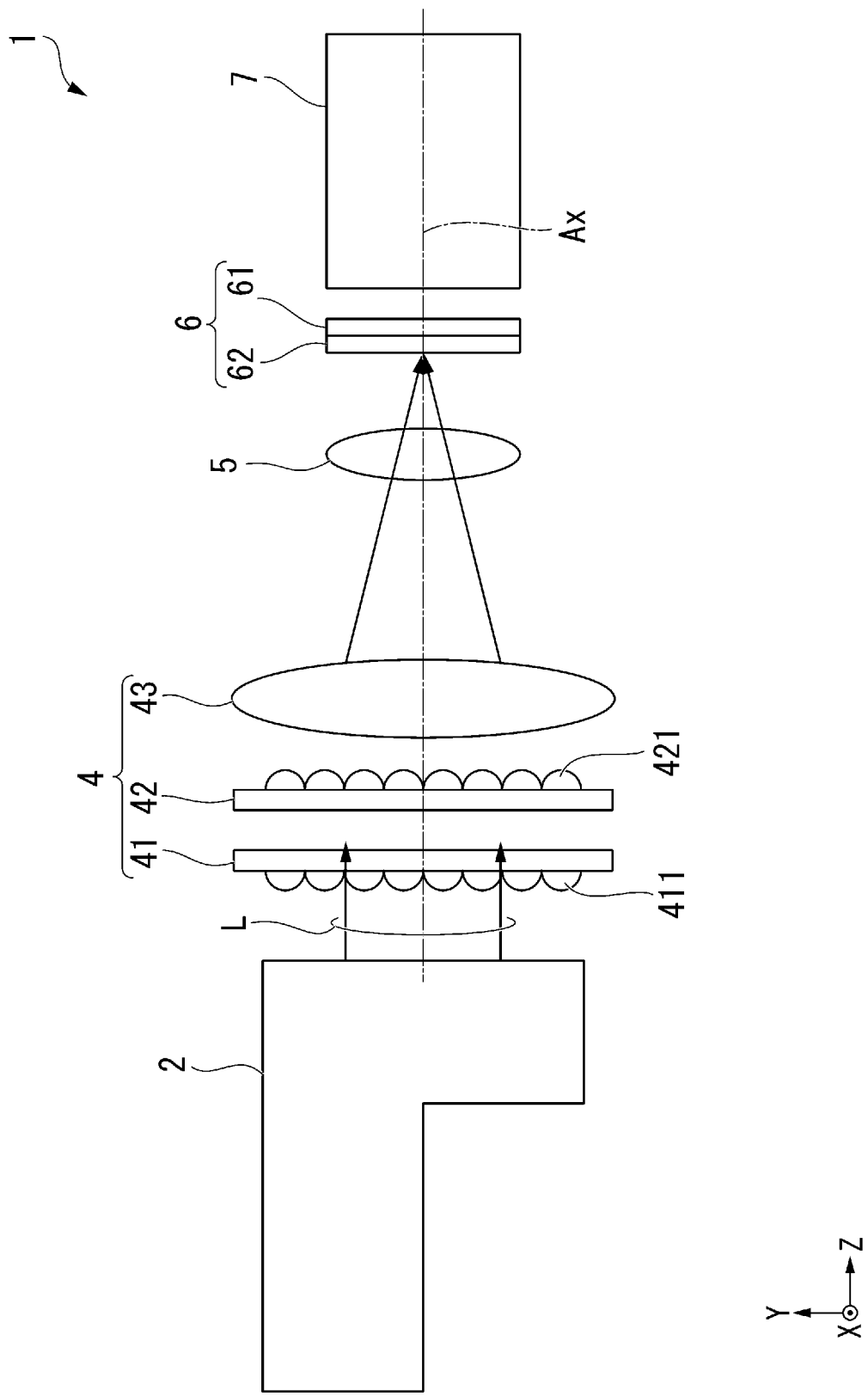
FIG. 1 is a schematic configuration diagram of a projector according to a first embodiment.

FIG. 1 is a schematic configuration diagram of a projector 1 according to the present embodiment.

In the following drawings, components are drawn at different dimensional scales in some cases for clarification of each of the components.

The projector 1 according to the present embodiment modulates light outputted from a light source apparatus 2 to form an image according to image information and enlarges and projects the formed image on a projection receiving surface, such as a screen. In other words, the projector 1 modulates the light outputted from the light source apparatus 2 by using a single light modulator 6 including a single liquid crystal panel 61 to form an image and projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are disposed in predetermined positions along an illumination optical axis Ax. The illumination optical axis Ax is defined as an axis extending along the traveling direction of the chief ray of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light onto the projection receiving surface (not shown), such as a screen. The projection optical apparatus 7 includes a single projection lens or a plurality of projection lenses.

In the following description, an axis parallel to the traveling direction of the light outputted from the light source apparatus 2 along the illumination optical axis Ax is called an axis Z, and the light traveling direction is called a direction +Z. Two axes that are perpendicular to the axis Z and to each other are called an axis X and an axis Y. Out of the directions along the axes X, Y, and Z, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

The direction +X in the present embodiment corresponds to the first direction in the appended claims, and the direction −Z in the present embodiment corresponds to the second direction in the appended claims. The direction +Z in the present embodiment corresponds to the third direction in the appended claims, and the direction −X in the present embodiment corresponds to the fourth direction in the appended claims.

Configuration of Light Source Apparatus

Figure 2:
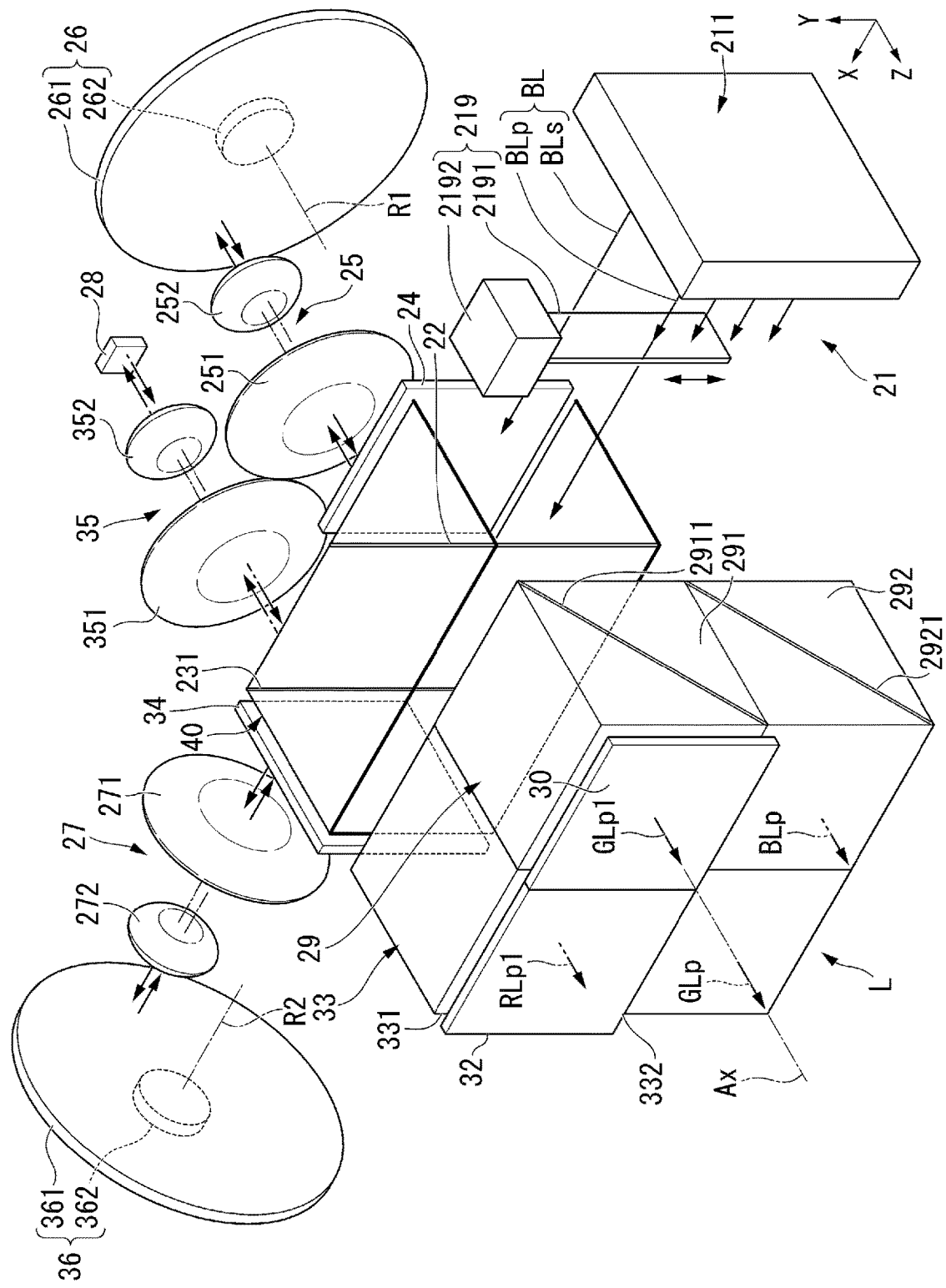
FIG. 2 is a perspective view of a light source apparatus according to the first embodiment.
Figure 3:
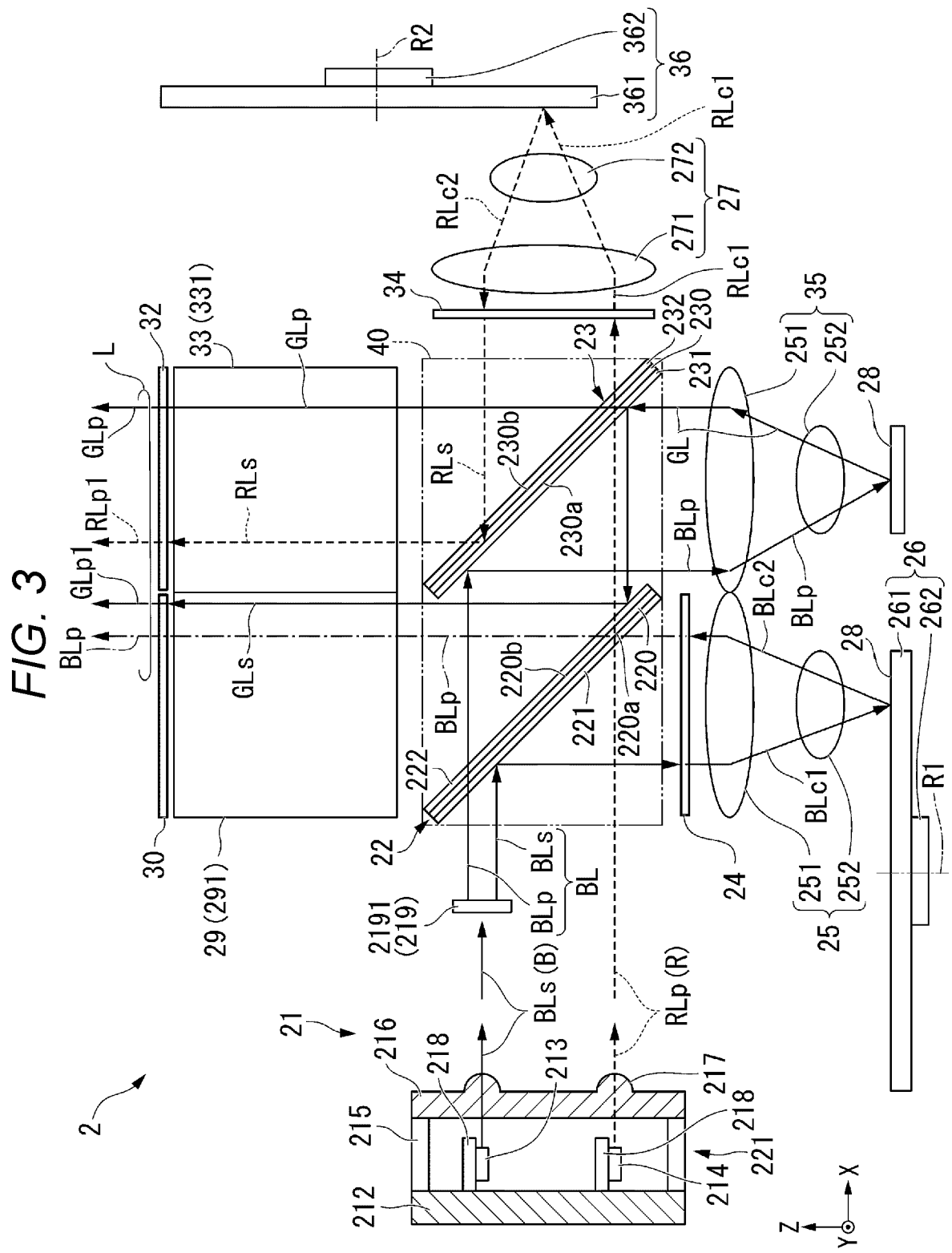
FIG. 3 is a plan view of the light source apparatus viewed in a direction +Y.

FIG. 2 is a perspective view of the light source apparatus 2 according to the present embodiment. FIG. 3 is a plan view of the light source apparatus 2 viewed in the direction +Y.

The light source apparatus 2 outputs the light L, which illuminates the light modulator 6, in the direction parallel to the illumination optical axis Ax, that is, in the direction +Z, as shown in FIGS. 2 and 3. The light L outputted by the light source apparatus 2 is linearly polarized light having an aligned polarization direction and contains a plurality of spatially separated color luminous fluxes. In the present embodiment, the light L outputted by the light source apparatus 2 is formed of four luminous fluxes each formed of P-polarized light. The four luminous fluxes are green light GLp1, blue light BLp, red light RLp1, and green light GLp.

The light source apparatus 2 includes a light source section 21, a first optical member 22, a second optical member 23, a first retardation element 24, a first light collector 25, a first diffuser 26, a second retardation element 34, a second light collector 27, a second diffuser 36, a first color separator 29, a second color separator 33, a fourth retardation element 30, a fifth retardation element 32, a third light collector 35, a wavelength converter 28, and a mirror unit 40.

A P-polarized component in the present embodiment corresponds to the light polarized in a first polarization direction in the appended claims, and an S-polarized component corresponds to the light polarized in a second polarization direction in the appended claims. As will be described later, the first optical member 22 and the second optical member 23 differ from the first color separator 29 and the second color separator 33 in terms of the orientation of a polarized component separation film or a color luminous flux separation film. The notation of the P-polarized component and the S-polarized component is therefore expressed in terms of polarization direction with respect to the first optical member 22 and the second optical member 23, and the notation is reversed for the first color separator 29 and the second color separator 33. That is, the P polarized component with respect to the first optical member 22 and the second optical member 23 is the S polarized component with respect to the first color separator 29 and the second color separator 33, and the S polarized component with respect to the first optical member 22 and the second optical member 23 is the P polarized component with respect to the first color separator 29 and the second color separator 33. It is, however, noted that the P-polarized component and the S-polarized component are hereinafter used as the polarization directions with respect to the first optical member 22 and the second optical member 23 so as not to cause confusion in the description.

Configuration of Light Source Section

The light source section 21 includes a light source 211 and a movable retarder 219. The light source 211 outputs blue light BL and red light RLp, which are incident on the first optical member 22 along the direction +X.

The light source 211 includes a substrate 212, a plurality of blue light emitters 213, a plurality of red light emitters 214, a frame 215, and a cover glass plate 216. The substrate 212 is made of a metal having high thermal conductivity, for example, copper. The light source 211 in the present embodiment has a multi-emitter package structure in which the blue light emitters 213 and the red light emitters 214 are mounted on the substrate 212.

The blue light emitters 213 are each formed of a semiconductor laser that outputs a blue beam B. The blue beam B is laser light having a blue wavelength band ranging, for example, from 440 to 480 nm and a peak wavelength that falls within the range, for example, from 450 to 460 nm. The blue beam B having the blue wavelength band in the present embodiment corresponds to the light having the first wavelength band in the appended claims. The blue light emitters 213 in the present embodiment correspond to the first light emitter in the appended claims.

The red light emitters 214 are each formed of a semiconductor laser that outputs a red beam R. The red beam R is laser light having a red wavelength band ranging, for example, from 585 to 720 nm and a peak wavelength that falls within the range of, for example, 635±20 nm. The red beam R having the red wavelength band in the present embodiment corresponds to the light having a second wavelength band in the appended claims. The red light emitters 214 in the present embodiment correspond to the second light emitter in the appended claims.

In the present embodiment, the plurality of blue light emitters 213 and the plurality of red light emitters 214 are arranged along the axis Y. The plurality of blue light emitters 213 and the plurality of red light emitters 214 are supported by the substrate 212 via support members 218. The number of blue light emitters 213 and the number of red light emitters 214 are each not limited to a specific number. The light source 211 in the present embodiment includes a row of blue light emitters 213 and a row of red light emitters 214 by way of example, and a plurality of rows of blue light emitters 213 and a plurality of rows of red light emitters 214 may instead be provided along the direction Z. The number of rows of light emitters 213 may be equal to or different from the number of rows of red light emitters 214.

The frame 215 attaches the cover glass plate 216 to the substrate 212. A plurality of collimator lenses 217 are integrated with the cover glass plate 216. The collimator lenses 217 are each formed of a convex lens. The collimator lenses 217 each parallelize the beam outputted from the corresponding blue light emitter 213 or red light emitter 214. The collimator lenses 217 may be separate from the cover glass plate 216.

Figure 4:
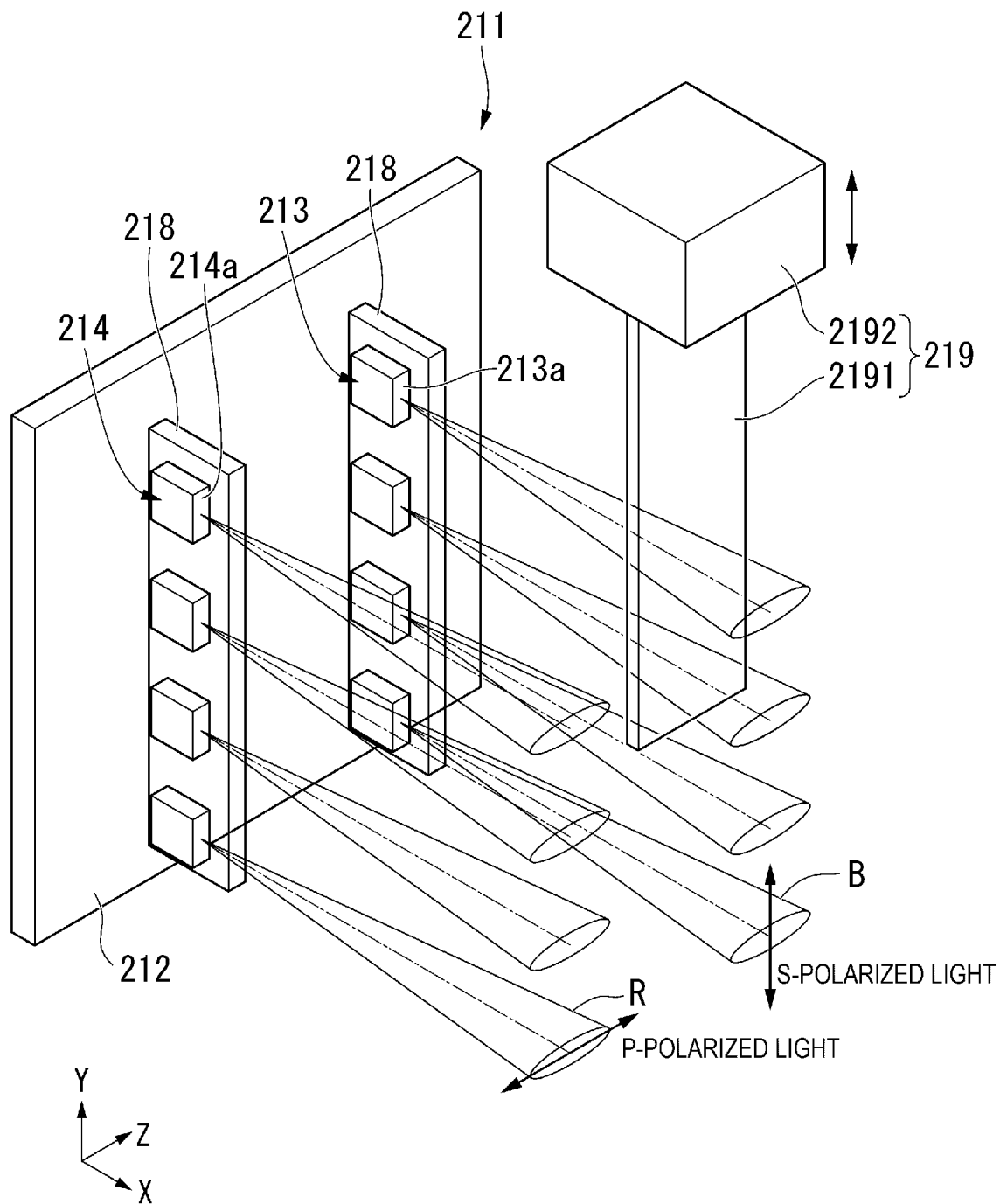
FIG. 4 shows a key configuration of a light source.

FIG. 4 shows a key configuration of the blue light emitters 213 and the red light emitters 214 incorporated in the light source 211. In FIG. 4, the frame 215, the cover glass plate 216, and other components of the light source 211 are omitted for ease of illustration.

A light exiting surface 213a of each of the blue light emitters 213 has a substantially oblong planar shape, as shown in FIG. 4.

The blue light emitters 213 are so arranged in the axis-Y direction in the light source 211 that the lengthwise direction of each of the light exiting surfaces 213a coincides with the axis-Y direction. In this case, the blue beam B outputted from each of the blue light emitters 213 has an elliptical shape having a major axis extending in the widthwise direction of the light exiting surface 213a (axis-Z direction). The blue beam B is linearly polarized light having a polarization direction parallel to the lengthwise direction of the light exiting surface 213a (axis-Y direction). That is, the blue light emitters 213 in the present embodiment are arranged in the light source 211 so as to each output S-polarized light as the blue beam B.

Alight exiting surface 214a of each of the red light emitters 214 has a substantially oblong planar shape, as the light exiting surface 213a of each of the blue light emitters 213 does.

The red light emitters 214 are so arranged in the axis-Y direction in the light source 211 that the lengthwise direction of each of the light exiting surfaces 214a coincides with the axis-Y direction. In this case, the red beam R outputted from each of the red light emitters 214 has an elliptical shape having a major axis extending in the widthwise direction of the light exiting surface 214a (axis-Z direction). The red beam R is linearly polarized light having a polarization direction parallel to the widthwise direction of the light exiting surface 214a, unlike the blue beam B. That is, the red light emitters 214 in the present embodiment are arranged in the light source 211 so as to each output P-polarized light as the red beam R.

The thus configured light source 211 in the present embodiment can output blue light BLs formed of the S-polarized blue beams B outputted from the plurality of blue light emitters 213 and red light RLp formed of the P-polarized red beams R outputted from the plurality of red light emitters 214.

The movable retarder 219 includes a third retardation element 2191 and a mover 2192, as shown in FIG. 4. The third retardation element 2191 is insertable into the optical path of the blue light BLs outputted from the light source 211 along the axis Y. The mover 2192 is formed, for example, of an actuator and moves the third retardation element 2191 along the axis-Y direction.

The third retardation element 2191 is formed of a half-wave plate or a quarter-wave plate for the blue wavelength band. Part of the S-polarized blue light BLs incident on the third retardation element 2191 is converted by the third retardation element 2191 into P-polarized blue light BLp. The blue light having passed through the third retardation element 2191 is therefore the mixture of the S-polarized blue light BLs and the P-polarized blue light BLp mixed at a predetermined ratio. That is, the third retardation element 2191 receives the blue light BLs outputted from the light source 211 and outputs blue light containing the S-polarized blue light BLs and the P-polarized blue light BLp.

The mover 2192 adjusts the travel of the third retardation element 2191 in the direction Y to adjust the ratio between the amount of S-polarized blue light BLs and the amount of P-polarized blue light BLp contained in the light that passes through the third retardation element 2191. When there is no need to adjust the ratio between the amount of blue light BLs and the amount of blue light BLp, the mover 2192, which moves the third retardation element 2191, may not be provided. In this case, the position of the third retardation element 2191 may be so fixed that the ratio between the amount of blue light BLs and the amount of blue light BLp is a value set in advance.

The light source section 21 in the present embodiment thus outputs the blue light BL, which has the blue wavelength band and contains the S-polarized blue light BLs and the P-polarized blue light BLp, and the P-polarized red light RLp. In the present embodiment, the blue light BLs having the blue wavelength band corresponds to the first light having a first wavelength band in the appended claims. The P-polarized blue light BLp corresponds to the light polarized in a first polarization direction in the appended claims, and the S-polarized blue light BLs corresponds to the light polarized in a second polarization direction in the appended claims. The red light RLp having the red wavelength band corresponds to the second light having a second wavelength band in the appended claims.

In the light source 211 in the present embodiment, the blue light emitters 213 are disposed so as to output the S-polarized blue light BLs and may instead be disposed so as to output P-polarized blue light because the movable retarder 219 can arbitrarily set the ratio between the amount of S-polarized light and the amount of P-polarized light. That is, the blue light emitters 213 may each be rotated by 90° around the light exiting optical axis of the blue light emitter 213. The blue light emitters 213 or the red light emitters 214 are each not necessarily formed of a semiconductor laser and may instead each be formed of any other solid-state light source, such as an LED (light emitting diode).

Configuration of First Optical Member

The first optical member 22 receives along the direction +X the blue light BL and the red light RLp outputted from the light source 211, the blue light BL containing the S-polarized blue light BLs and the P-polarized blue light BLp and the red light RLp formed of the P-polarized component. The first optical member 22 is formed of a plate-shaped polarization separator. The first optical member 22 in the present embodiment corresponds to the first polarization separator in the appended claims.

The first optical member 22 includes a first transparent substrate 220, a first optical layer 221, and a second optical layer 222. The first transparent substrate 220 has a first surface 220a and a second surface 220b, which face away from each other. The first transparent substrate 220 is formed, for example, of a typical optical glass plate.

The first transparent substrate 220 is disposed so as to incline by 45° with respect to the axes X and Z. In other words, the first transparent substrate 220 inclines by 45° with respect to the planes XY and YZ.

The first transparent substrate 220 is so disposed that the first surface 220a faces the light source section 21. The first optical layer 221 is formed at the first surface 220a of the first transparent substrate 220. Therefore, the first optical layer 221 is disposed so as to face the light source section 21 and inclines by 45° with respect to the planes XY and YZ.

The first optical layer 221 has a polarization separation characteristic that causes the first optical layer 221 to transmit the P-polarized blue light BL and reflect the S-polarized blue light BL out of the light incident on the first optical layer 221. The first optical layer 221 therefore transmits the P-polarized blue light BLp along the direction +X and reflects the S-polarized blue light BLs in the direction −Z out of the blue light BL incident on the first optical layer 221 along the direction +X. The first optical layer 221 is further characterized in that it transmits light having the red wavelength band. The first optical layer 221 therefore transmits along the direction +X the P-polarized red light RLp incident along the direction +X. The first optical layer 221 is formed, for example, of a dielectric multilayer film.

The second optical layer 222 is formed at the second surface 220b of the first transparent substrate 220. That is, the second optical layer 222 is disposed in a position shifted in the direction +X from the first optical layer 221. The second optical layer 222 is optically characterized in that it transmits light formed of the P-polarized component and reflects light formed of the S-polarized component irrespective of the wavelength band of the light incident on the second optical layer 222. The P-polarized blue light BLp and the P-polarized red light RLp that have passed through the first optical layer 221 therefore pass through the first transparent substrate 220 and is incident on the second optical layer 222. The second optical layer 222 transmits in the direction +X the P-polarized blue light BLp and the P-polarized red light RLp incident from the first optical layer 221 along the direction +X. In the present embodiment, the second optical layer 222 is formed, for example, of a dielectric multilayer film. The second optical layer 222 in the present embodiment only needs to have the polarization separation function of transmitting light formed of the P-polarized component and reflecting light formed of the S-polarized component irrespective of the wavelength band of the light incident on the second optical layer 22, as described above, whereby the second optical layer 222 is readily designed as a film.

The first optical member 22 having the configuration described above can transmit in the direction +X the P-polarized blue light BLp incident along the direction +X from the light source section 21, reflect in the direction −Z the S-polarized blue light BLs incident along the direction +X from the light source section 21, and transmit in the direction +X the P-polarized red light RLp incident along the direction +X from the light source section 21.

Since the first optical member 22 in the present embodiment is a plate-shaped polarization separator, the function of the first optical layer 221 formed at the first surface 220a of the first transparent substrate 220 and the function of the second optical layer 222 formed at the second surface 220b of the first transparent substrate 220 can be designed separately. The first optical layer 221 and the second optical layer 222 are therefore relatively readily designed as films.

Configuration of Second Optical Member

The second optical member 23 is disposed in a position shifted in the direction +X from the first optical member 22. That is, the second optical member 23 is disposed in a position shifted in the direction +X from the second optical layer 222 of the first optical member 22. The P-polarized blue light BLp having passed through the first optical member 22 is incident on the second optical member 23. The second optical member 23 is formed of a plate-shaped polarization separator, as the first optical member 22 is. The second optical member 23 in the present embodiment corresponds to the second polarization separator in the appended claims.

The second optical member 23 includes a second transparent substrate 230, a third optical layer 231, and a fourth optical layer 232. The second transparent substrate 230 has a third surface 230a and a fourth surface 230b, which face away from each other. The second transparent substrate 230 is formed, for example, of a typical optical glass plate.

The second transparent substrate 230 is disposed so as to incline by 45° with respect to the axes X and Z. In other words, the second transparent substrate 230 inclines by 45° with respect to the planes XY and YZ.

The second transparent substrate 230 is so disposed that the third surface 230a faces the first optical member 22. That is, the third surface 230a of the second transparent substrate 230 and the second surface 220b of the first transparent substrate 220 face each other. The third optical layer 231 is formed at the third surface 230a of the second transparent substrate 230. Therefore, the third optical layer 231 is disposed so as to face the second optical layer 222 and inclines by 45° with respect to the planes XY and YZ.

The third optical layer 231 is characterized in that it reflects P-polarized light having the blue wavelength band out of the light incident on the third optical layer 231. The third optical layer 231 therefore reflects in the direction −Z the P-polarized blue light BLp incident along the direction +X. The third optical layer 231 is further optically characterized in that it transmits at least P-polarized light having the red wavelength band. The third optical layer 231 therefore transmits in the direction +X the P-polarized red light RLp incident from the first optical member 22 along the direction +X. The third optical layer 231 further has a polarization separation characteristic that causes the third optical layer 231 to transmit the P-polarized component and reflect the S-polarized component out of light having a green wavelength band. The third optical layer 231 is formed, for example, of a dielectric multilayer film.

The fourth optical layer 232 is formed at the fourth surface 230b of the second transparent substrate 230. The fourth optical layer 232 is therefore disposed in a position shifted in the direction +X from the third optical layer 231. The fourth optical layer 232 is optically characterized in that it transmits at least light formed of the P-polarized component out of light having the green wavelength band. The fourth optical layer 232 further has a polarization separation characteristic that causes the fourth optical layer 232 to transmit the P-polarized component and reflect the S-polarized component out of light having the red wavelength band. The fourth optical layer 232 is formed, for example, of a dielectric multilayer film. When a film optically characterized in that the film reflects the S-polarized component of light having the red wavelength band is used as the third optical layer 231, the fourth optical layer 232 can be formed of a simple AR coating.

The second optical member 23 having the configuration described above can reflect in the direction −Z the P-polarized blue light BLp incident from the first optical member 22 along the direction +X and transmit in the direction +X S-polarized red light RLs incident from the first optical member 22 along the direction +X.

Since the second optical member 23 in the present embodiment is a plate-shaped polarization separator, the function of the third optical layer 231, which is formed at the third surface 230a of the second transparent substrate 230, and the function of the fourth optical layer 232, which is formed at the fourth surface 230b of the second transparent substrate 230, can be designed separately. The third optical layer 231 and the fourth optical layer 232 are therefore relatively readily designed as films.

Configuration of First Retardation Element

The first retardation element 24 is disposed in a position shifted in the direction −Z from the first optical member 22. That is, the first retardation element 24 is disposed on the axis Z between the first optical member 22 and the first diffuser 26. The S-polarized blue light BLs reflected in the direction −Z off the first optical layer 221 of the first optical member 22 is incident on the first retardation element 24. The first retardation element 24 is formed of a quarter-wave plate for the blue wavelength band of the blue light BLs incident on the first retardation element 24. The S-polarized blue light BLs reflected off the first optical member 22 is converted by the first retardation element 24 into, for example, right-handed circularly polarized blue light BLc1, which then exits toward the first light collector 25. That is, the first retardation element 24 converts the polarization state of the blue light BLs incident thereon.

Configuration of First Light Collector

The first light collector 25 is disposed in a position shifted in the direction −Z from the first retardation element 24. That is, the first light collector 25 is disposed on the axis Z between the first retardation element 24 and the first diffuser 26. The first light collector 25 focuses the blue light BLc1 incident from the first retardation element onto a diffuser plate 261 of the first diffuser 26. Furthermore, the first light collector 25 parallelizes blue light BLc2 to be described later, which is incident from the first diffuser 261. In the example shown in FIG. 3, the first light collector 25 is formed of a first lens 251 and a second lens 252, but the number of lenses that form the first light collector 25 is not limited to a specific number.

Configuration of First Diffuser

The first diffuser 26 is disposed in a position shifted in the direction −Z from the first light collector 25. That is, the first diffuser 26 is disposed in a position shifted in the direction −Z from the first optical member 22. The first diffuser 26 reflects in the direction +Z the blue light BLc1 incident from the first light collector 25 in the direction −Z while diffusing the blue light BLc1 at angles of diffusion comparable to those of green light GL emitted from the wavelength converter 28, which will be described later. The first diffuser 26 includes the diffuser plate 261 and a rotator 262. The diffuser plate 261 preferably has a reflection characteristic that achieves closest possible Lambertian scattering and reflects the blue light BLc1 incident on the diffuser plate 261 at wide angles. The rotator 262 is formed, for example, of a motor and rotates the diffuser plate 261 around an axis of rotation R1 parallel to the direction +Z.

The diffuser plate 261 in the present embodiment corresponds to the first diffusion element in the appended claims.

The blue light BLc1 incident on the diffuser plate 261 is reflected off the diffuser plate 261 and converted into the blue light BLc2, which is circularly polarized light having a polarization rotation direction opposite the polarization rotation direction of the blue light BLc1 before the conversion. That is, the right-handed circularly polarized blue light BLc1 is converted by the diffuser plate 261 into left-handed circularly polarized blue light BLc2. The blue light BLc2 emitted from the first diffuser 26 passes through the first light collector 25 in the direction +Z and is then incident on the first retardation element 24 again. In this process, the blue light BLc2 incident from the first light collector 25 on the first retardation element 24 is converted by the first retardation element 24 into the P-polarized blue light BLp. The converted blue light BLp is incident on the first optical member 22. In this process, the first optical layer 221 transmits in the direction +Z the blue light BLp emitted from the diffuser plate 261 along the direction +Z and incident on the first optical layer 221. The second optical layer 222 transmits in the direction +Z the blue light BLp having exited out of the first optical layer 221 along the direction +Z, having passed through the first transparent substrate 220, and having been incident on the second optical layer 222. The converted blue light BLp thus exits out of the first optical member 22 in the direction +Z.

Configuration of Second Retardation Element

The second retardation element 34 is disposed in a position shifted in the direction +X from the second optical member 23. That is, the second retardation element 34 is disposed on the axis X between the second optical member 23 and the second diffuser 36. The P-polarized red light RLp incident from the second optical member 23 along the direction +X is incident on the second retardation element 34. The second retardation element 34 is formed of a quarter-wave plate for the red wavelength band of the red light RLp incident on the second retardation element 34. The P-polarized red light RLp having passed through the second optical member 23 is converted by the second retardation element 34 into, for example, right-handed circularly polarized red light RLc1, which then exits toward the second light collector 27. That is, the second retardation element 34 converts the polarization state of the red light RLp incident thereon.

Configuration of Second Light Collector

The second light collector 27 is disposed in a position shifted in the direction +X from the second retardation element 34. That is, the second light collector 27 is disposed on the axis X between the second retardation element 34 and the second diffuser 36. The second light collector 27 focuses the red light RLc1 incident from the second retardation element 34 onto a diffuser plate 361 of the second diffuser 36. Furthermore, the second light collector 27 parallelizes red light RLc2 to be described later, which is incident from the second diffuser 36. In the example shown in FIG. 3, the second light collector 27 is formed of a first lens 271 and a second lens 272, but the number of lenses that form the second light collector 27 is not limited to a specific number.

Configuration of Second Diffuser

The second diffuser 36 is disposed in a position shifted in the direction +X from the second light collector 27. That is, the second diffuser 36 is disposed in a position shifted in the direction +X from the second optical member 23. The second diffuser 36 reflects in the direction +Z the red light RLp from the second light collector 27 incident in the direction +X while diffusing the red light RLp at angles of diffusion comparable to those of the green light GL emitted from the wavelength converter 28, which will be described later. The second diffuser 36 includes the diffuser plate 361 and a rotator 362. The diffuser plate 361 preferably has a reflection characteristic that achieves closest possible Lambertian scattering and reflects the red light RLc1 incident on the diffuser plate 361 at wide angles. The rotator 362 is formed, for example, of a motor and rotates the diffuser plate 361 around an axis of rotation R2 parallel to the axis X.

The diffuser plate 361 in the present embodiment corresponds to the second diffusion element in the appended claims.

The red light RLc1 incident on the diffuser plate 361 is reflected off the diffuser plate 361 and converted into the red light RLc2, which is circularly polarized light having a polarization rotation direction opposite the polarization rotation direction of the red light RLc1 before the conversion. That is, the left-handed circularly polarized red light RLc1 is converted by the diffuser plate 361 into right-handed circularly polarized red light RLc2. The red light RLc2 emitted from the second diffuser 36 passes through the second light collector 27 in the direction −X and is incident again on the second retardation element 34. In this process, the red light RLc2 incident from the second light collector 27 on the second retardation element 34 is converted by the second retardation element 34 into the S-polarized red light RLs. The converted red light RLs is incident on the second optical member 23. In this process, the fourth optical layer 232 reflects in the direction +Z the red light RLs emitted from the diffuser plate 361 along the direction −X and incident on the fourth optical layer 232. The converted red light RLs thus exits out of the second optical member 23 in the direction +Z.

Configuration of Third Light Collector

The third light collector 35 is disposed in a position shifted in the direction −Z from the second optical member 23. That is, the third light collector 35 is disposed on the axis Z between the second optical member 23 and the wavelength converter 28. The third light collector 35 focuses the blue light BLp reflected off the second optical member 23 onto the wavelength converter 28. Furthermore, the third light collector 35 parallelizes the green light GL to be described later, which is emitted from the wavelength converter 28, and directs the parallelized green light GL toward the second optical member 23. In the example shown in FIG. 3, the third light collector 35 is formed of a first lens 351 and a second lens 352, but the number of lenses that form the third light collector 35 is not limited to a specific number.

Configuration of Wavelength Converter

The wavelength converter 28 is disposed in a position shifted in the direction −Z from the third light collector 35. That is, the wavelength converter 28 is disposed in a position shifted in the direction −Z from the second optical member 23. The wavelength converter 28 is a reflective wavelength converter that is excited by light incident thereon and emits light having a wavelength different from the wavelength of the incident light in a direction opposite the direction of the incident light. In other words, the wavelength converter 28 converts the light incident thereon in terms of wavelength and emits the light having the converted wavelength in the direction opposite the direction of the incident light.

In the present embodiment, the wavelength converter 28 contains a green phosphor that is excited by blue light and emits green light. Specifically, the wavelength converter 28 contains a phosphor material, for example, an $Lu_3Al_5O_{12}$:$Ce^{3+}$-based phosphor, a $Y_3O_4$:$Eu^{2+}$-based phosphor, a $(Ba,Sr)_2SiO_4$:$Eu^{2+}$-based phosphor, a $Ba_3Si_6O_{12}N_2$:$Eu^{2+}$-based phosphor, an $(Si,Al)_6(O,N)_8$:$Eu^{2+}$-based phosphor.

The wavelength converter 28 emits in the direction +Z fluorescence having the green wavelength band formed of wavelengths longer than those in the blue wavelength band of the blue light BLp incident from the second optical member 23 along the direction −Z, that is, unpolarized green light GL. The green light GL is, for example, green light that is the mixture of the S-polarized component and the P-polarized component and has a wavelength band ranging from 500 to 570 nm.

The fluorescence having the green wavelength band in the present embodiment, that is, the unpolarized green light GL corresponds to the third light having a third wavelength band in the appended claims.

The green light GL emitted from the wavelength converter 28 passes along the direction +Z through the third light collector 35, which substantially parallelizes the green light GL, and the parallelized green light GL is then incident on the second optical member 23. The wavelength converter 28 in the present embodiment is a fixed wavelength converter and may be replaced with a rotary wavelength converter including a rotator that rotates the wavelength converter 28 around an axis of rotation parallel to the axis Z. In this case, an increase in the temperature of the wavelength converter 28 can be suppressed, whereby the wavelength conversion efficiency can be increased.

The third optical layer 231 of the second optical member 23 has the polarization separation characteristic that causes the third optical layer 231 to reflect S-polarized light and transmit P-polarized light out of light having the green wavelength band, as described above. Therefore, out of the unpolarized green light GL incident on the third optical layer 231, S-polarized green light GLs is reflected off the third optical layer 231 in the direction −X and incident on the second optical layer 222 of the first optical member 22. The second optical layer 222 is optically characterized in that it reflects S-polarized light of the light incident thereon irrespective of the wavelength band of the incident light, as described above. The second optical layer 222 therefore reflects in the direction +Z the S-polarized green light GLs incident along the direction −X.

The first optical member 22 can therefore direct in the direction +Z the S-polarized green light GLs out of the green light GL emitted from the wavelength converter 28.

On the other hand, out of the unpolarized green light GL incident on the third optical layer 231, P-polarized green light GLp passes through the third optical layer 231 in the direction +Z and is incident on the fourth optical layer 232. The fourth optical layer 232 transmits at least the P-polarized component out of light having the green wavelength band, as described above. The fourth optical layer 232 therefore transmits in the direction +Z the P-polarized green light GLp incident from the third optical layer 231 along the direction +Z.

The second optical member 23 can therefore direct the P-polarized green light GLp in the direction +Z.

In the present embodiment, the P-polarized green light GLp corresponds to the third light polarized in the first polarization direction in the appended claims, and the S-polarized green light GLs corresponds to the third light polarized in the second polarization direction in the appended claims.

Configuration of Mirror Unit

Figure 5:
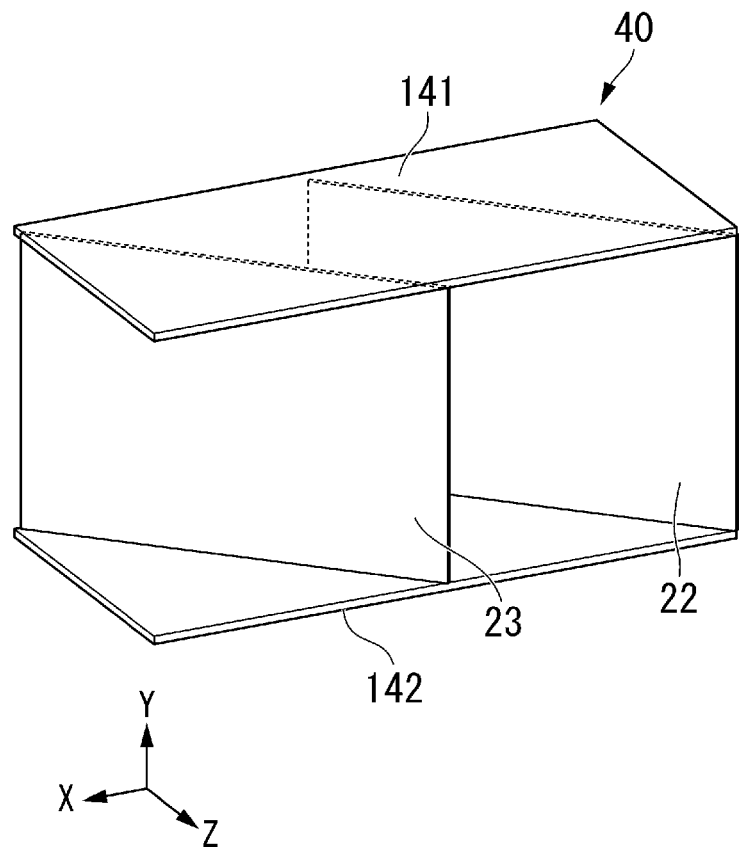
FIG. 5 is a perspective view showing the configuration of a mirror unit.
Figure 6:
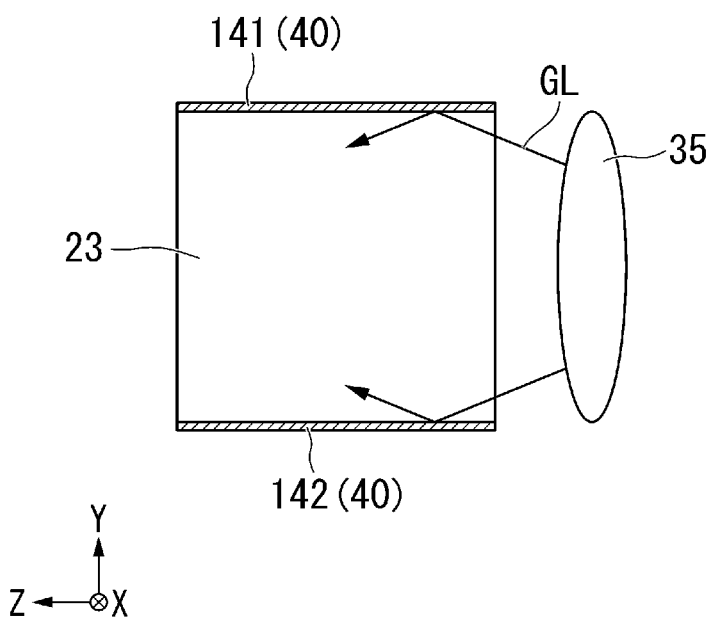
FIG. 6 is a side cross-sectional view of the mirror unit viewed in a direction X from the negative side toward the positive side thereof.

FIG. 5 is a perspective view showing the configuration of the mirror unit 40. FIG. 6 is a side cross-sectional view of the mirror unit 40 viewed in the direction X from the negative side toward the positive side thereof. FIG. 6 shows the green light GL having exited out of the third light collector 35 and incident on the second optical member 23.

The mirror unit 40 includes a first mirror 141 and a second mirror 142, as shown in FIG. 5. The mirror unit 40 in the present embodiment functions as a support member that supports the first transparent substrate 220 and the second transparent substrate 230.

The first mirror 141 is disposed in a position shifted in the direction +Y from the first transparent substrate 220 and the second transparent substrate 230. The first mirror 141 is so configured that at least the inner surface facing the first transparent substrate 220 and the second transparent substrate 230 forms a light reflection surface. The second mirror 142 is disposed in a position shifted in the direction −Y from the first transparent substrate 220 and the second transparent substrate 230. The second mirror 142 is so configured that at least the inner surface facing the first transparent substrate 220 and the second transparent substrate 230 forms a light reflection surface.

In the present embodiment, the direction +Y corresponds to the fifth direction in the appended claims, and the direction −Y corresponds to the sixth direction in the appended claims.

In the present embodiment, the green light GL emitted from the wavelength converter 28 is substantially parallelized by the third light collector 35, but part of the green light GL diverges and is incident on the second optical member 23. Consider now, as a light source apparatus according to Comparative Example, a configuration in which the mirror unit 40 is removed from the light source apparatus 2 according to the present embodiment.

The second optical member 23 is a plate-shaped polarization separator. Therefore, when the mirror unit 40 is not provided, as in the light source apparatus according to Comparative Example, part of the green light GL having exited out of the third light collector 35 spreads outward beyond the second optical member 23 and cannot be incident on the second optical member 23, which can undesirably reduce the light utilization efficiency of the green light GL.

In contrast, since the light source apparatus 2 according to the present embodiment includes the mirror unit 40, the green light GL having spread in the direction Y is reflected off the first mirror 141 and the second mirror 142 and can therefore be captured by the second optical member 23, as shown in FIG. 6. The light utilization efficiency of the green light GL can thus be improved.

The blue light BLp having exited out of the first light collector 25 and spread in the direction Y is also reflected off the first mirror 141 and the second mirror 142 and can therefore be efficiently captured by the first optical member 22. The light utilization efficiency of the blue light BLp can thus be improved. The red light RLs having exited out of the second light collector 27 and spread in the direction Y is also reflected off the first mirror 141 and the second mirror 142 and can therefore be efficiently captured by the second optical member 23. The light utilization efficiency of the red light RLs can thus be improved. Furthermore, the blue light BL and red light RLp having been outputted from the light source section 21 and having spread in the direction Y are also reflected off the first mirror 141 and the second mirror 142 and can therefore be efficiently captured by the first optical member 22. The light utilization efficiency of the blue light BL and the red light RLp can thus be improved.

Configuration of First Color Separator

Figure 7:
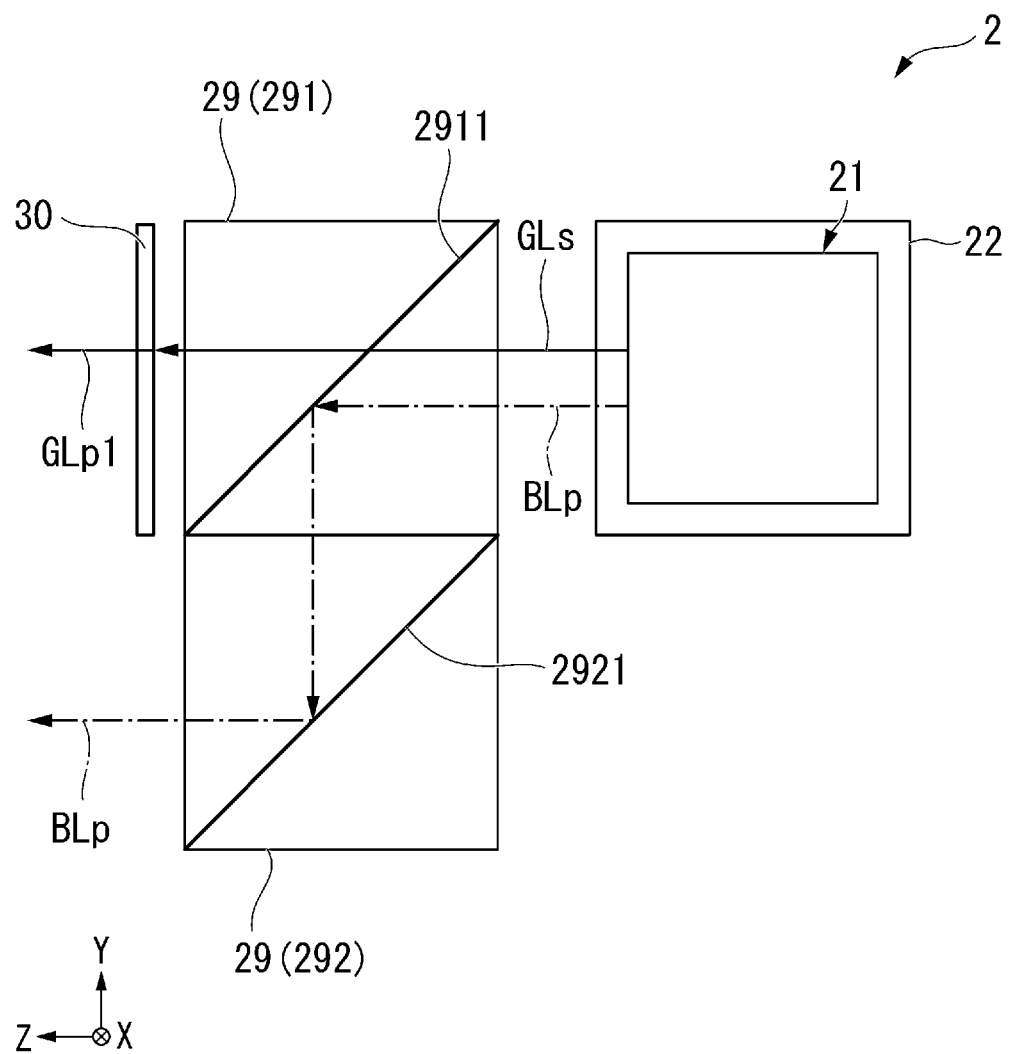
FIG. 7 is a side view of the light source apparatus viewed in a direction −X.

FIG. 7 is a side view of the light source apparatus 2 viewed in the direction −X. That is, FIG. 7 shows the first color separator 29, the fourth retardation element 30, and other components viewed in the direction −X. In FIG. 7, the first retardation element 24, the first light collector 25, and the first diffuser 26, and other components are omitted for ease of illustration.

The first color separator 29 is disposed in a position shifted in the direction +Z from the first optical member 22, as shown in FIG. 7. The first color separator 29 includes a dichroic prism 291 and a reflection prism 292. The dichroic prism 291 and the reflection prism 292 are arranged side by side along the axis Y. The first color separator 29 separates the light having exited out of the first optical member 22 along the direction +Z into the blue light BLp and the green light GLs.

The light containing the blue light BLp and the green light GLs and having exited out of the first optical member 22 enters the dichroic prism 291. The dichroic prism 291 is formed of a prism-shaped color separator that is the combination of two bases each having a substantially right-angled isosceles triangular columnar shape and has a substantially rectangular solid shape as a whole. A color separation layer 2911 is provided at the interface between the two bases. The color separation layer 2911 inclines by 45° with respect to the axes Y and Z. In other words, the color separation layer 2911 inclines by 45° with respect to the planes XY and YZ.

The color separation layer 2911 functions as a dichroic mirror that reflects a blue light component and transmits color light having a wavelength band formed of wavelengths longer than those in the blue wavelength band, that is, a green light component, out of the light incident on the color separation layer 2911. Therefore, out of the light having entered the dichroic prism 291 from the first optical member 22, the green light GLs passes through the color separation layer 2911 in the direction +Z and exits out of the dichroic prism 291.

On the other hand, out of the light having entered the dichroic prism 291 from the first optical member 22, the blue light BLp is reflected off the color separation layer 2911 in the direction −Y. In the present embodiment, the blue light BLp is light formed of the S-polarized component with respect to the color separation layer 2911 of the dichroic prism 291, and the green light GLs is light formed of the P-polarized component with respect to the color separation layer 2911 of the dichroic prism 291. That is, the color separation layer 2911 in the present embodiment reflects the blue light BLp incident as light formed of the S-polarized component and transmits the green light GLs incident as light formed of the P-polarized component. In general, a color separation layer readily reflects light formed of the S-polarized component and readily transmits light formed of the P-polarized component. Since the color separation layer 2911 in the present embodiment only needs to be designed so as to transmit P-polarized light and reflect S-polarized light as described above, the color separation layer 2911 is readily designed as a film.

The dichroic prism 291 may be replaced with a dichroic mirror including the color separation layer 2911. The first color separator 29 may be formed of the reflection prism 292 and a polarization separator including a polarization separation layer. Even when the first color separator 29 employs in place of the dichroic prism 291, for example, a polarization separator that transmits the incident blue light BLp in the direction +Z and reflects the incident green light GLs in the direction −Y toward the reflection prism 292, the blue light BLp and the green light GLs can be separated from each other as in the case of the first color separator 29 including the dichroic prism 291.

The reflection prism 292 is disposed in a position shifted in the direction −Y from the dichroic prism 291. The blue light BLp reflected off the color separation layer 2911 enters the reflection prism 292. The reflection prism 292 is a prism-shaped reflector that is the combination of two bases each having a substantially right-angled isosceles triangular columnar shape and has a substantially rectangular solid shape as a whole. A reflection layer 2921 is provided at the interface between the two bases. The reflection layer 2921 inclines by 45° with respect to the directions +Y and +Z. In other words, the reflection layer 2921 inclines by 45° with respect to the planes XY and YZ. That is, the reflection layer 2921 and the color separation layer 2911 are disposed in parallel to each other.

The reflection layer 2921 reflects in the direction +Z the blue light BLp incident from the dichroic prism 291 in the direction −Y. Blue light BLp1 reflected off the reflection layer 2921 exits out of the reflection prism 292 in the direction +Z. The reflection prism 292 may be replaced with a reflection mirror including the reflection layer 2921.

Configuration of Fourth Retardation Element

The fourth retardation element 30 is disposed in a position shifted in the direction +Z from the dichroic prism 291. In other words, the fourth retardation element 30 is disposed in the optical path of the green light GLs having exited out of the dichroic prism 291. The fourth retardation element 30 is formed of a half-wave plate for the green wavelength band of the green light GLs incident on the fourth retardation element 30. The fourth retardation element 30 converts the green light GLs incident from the dichroic prism 291 into P-polarized green light GLp1. The converted P-polarized green light GLp1 from the fourth retardation element 30 is outputted in the direction +Z from the light source apparatus 2 and enters the homogenizer 4 shown in FIG. 1. The fourth retardation element 30 may be provided so as to be in contact with a surface of the dichroic prism 291 that is the surface via which the green light GLs exits.

The green light GLp1 is spatially separated from the blue light BLp, exits via a light exiting position different from the light exiting position via which the blue light BLp exits out of the light source apparatus 2, and enters the homogenizer 4. In detail, the green light GLp1 exits via a light exiting position separate in the direction +Y from the light exiting position via which the blue light BLp exits out of the light source apparatus 2 and enters the homogenizer 4.

Configuration of Second Color Separator

Figure 8:
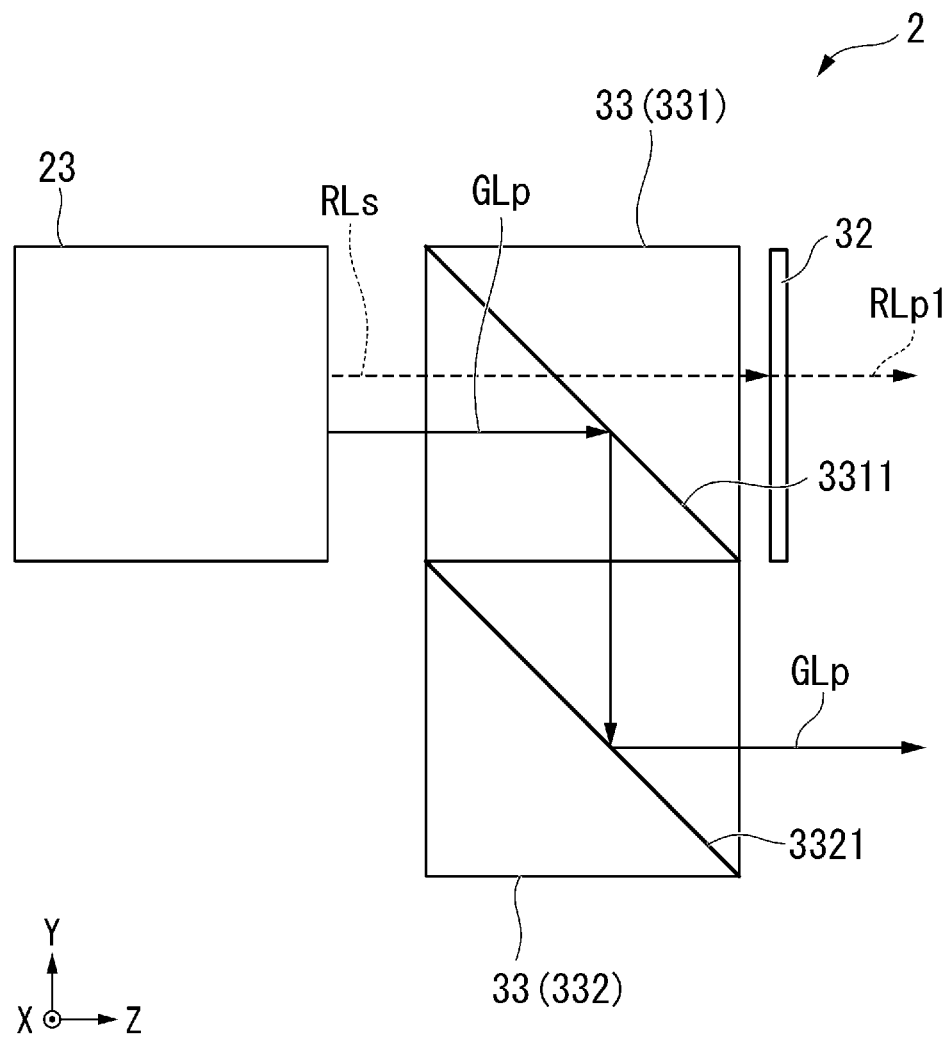
FIG. 8 is a side view of the light source apparatus viewed in a direction +X.

FIG. 8 is a side view of the light source apparatus 2 viewed in the direction +X. In other words, FIG. 8 shows the fifth retardation element 32 and the second color separator 33 viewed in the direction +X. In FIG. 8, the second diffuser 36, the third light collector 35, and the wavelength converter 28 are omitted.

The second color separator 33 is disposed in a position shifted in the direction +Z from the second optical member 23, as shown in FIG. 8. The second color separator 33 includes a dichroic prism 331 and a reflection prism 332. The dichroic prism 331 and the reflection prism 332 are arranged side by side along the axis Y. The second color separator 33 separates the light having exited out of the second optical member 23 in the direction +Z into the green light GLp and the red light RLs.

The dichroic prism 331 is formed of a prism-shaped color separator, as the dichroic prism 291 is. A color separation layer 3311 is provided at the interface between the two bases. The color separation layer 3311 inclines by 45° with respect to the directions +Y and +Z. In other words, the color separation layer 3311 inclines by 45° with respect to the planes XY and YZ. The color separation layer 3311 and the reflection layer 3321 are disposed in parallel to each other.

The color separation layer 3311 functions as a dichroic mirror that reflects the green light component and transmits a red light component of the light incident on the color separation layer 3311. Therefore, out of the light having entered the dichroic prism 331 from the second optical member 23, the red light RLs passes through the color separation layer 3311 in the direction +Z and exits out of the dichroic prism 331.

On the other hand, out of the light having entered the dichroic prism 331 from the second optical member 23, the green light GLp is reflected off the color separation layer 3311 in the direction -Y. In the present embodiment, the green light GLp is formed of the S-polarized component with respect to the color separation layer 3311 of the dichroic prism 331, and the red light RLs is formed of the P-polarized component with respect to the color separation layer 3311 of the dichroic prism 331. That is, the color separation layer 3311 in the present embodiment reflects the green light GLp incident as light formed of the S-polarized component and transmits the red light RLs incident as light formed of the P-polarized component. In general, since a color separation layer readily reflects S-polarized light and readily transmits P-polarized light, the color separation layer 3311 in the present embodiment, which is designed to transmit P-polarized light and reflect S-polarized light as described above, is readily designed as a film.

The dichroic prism 331 may be replaced with a dichroic mirror including the color separation layer 3311.

The reflection prism 332 is disposed in a position shifted in the direction -Y from the dichroic prism 331. The reflection prism 332 has the same configuration as that of the reflection prism 292. That is, the reflection prism 332 includes the reflection layer 3321 parallel to the color separation layer 3311 and the reflection layer 2921.

The reflection layer 3321 reflects in the direction +Z the green light GLp reflected off the color separation layer 3311 and incident on the reflection layer 3321. The green light GLp reflected off the reflection layer 3321 exits out of the reflection prism 332. The reflection prism 332 may be replaced with a reflection mirror including the reflection layer 3321.

Configuration of Fifth Retardation Element

The fifth retardation element 32 is disposed in a position shifted in the direction +Z from the dichroic prism 331. In other words, the fifth retardation element 32 is disposed in the optical path of the red light RLs having exited out of the dichroic prism 331. The fifth retardation element 32 is formed of a half-wave plate for the red wavelength band of the red light RLs incident on the fifth retardation element 32. The fifth retardation element 32 converts the red light RLs incident from the dichroic prism 331 into P-polarized red light RLp1. The converted P-polarized red light RLp1 from the fifth retardation element 32 is outputted in the direction +Z from the light source apparatus 2 and enters the homogenizer 4 shown in FIG. 1. The fifth retardation element 32 may be provided so as to be in contact with a surface of the dichroic prism 331 that is the surface via which the red light RLs exits.

The red light RLp1 is spatially separated from the green light GLp, exits via a light exiting position different from the light exiting position via which the green light GLp exits out of the light source apparatus 2, and enters the homogenizer 4. That is, the red light RLp1 is spatially separated from the blue light BLp, the green light GLp1, and the green light GLp, exits via a position different from the positions via which the blue light BLp, the green light GLp1, and the green light GLp exit, and enters the homogenizer 4. In other words, the red light RLp1 exits via a light exiting position separate in the direction +Y from the light exiting position via which the green light GLp exits out of the light source apparatus 2 and separate in the direction +X from the light exiting position via which the green light GLp1 exits out of the light source apparatus 2 and enters the homogenizer 4.

Configuration of Homogenizer

The homogenizer 4 homogenizes the illuminance in an image formation area of the light modulator 6, which is irradiated with the light outputted from the light source apparatus 2, as shown in FIG. 1. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination optical axis Ax. The plurality of lenses 411 of the first multi-lens 41 divide the light incident from the light source apparatus 2 into a plurality of sub-luminous fluxes.

Figure 9:
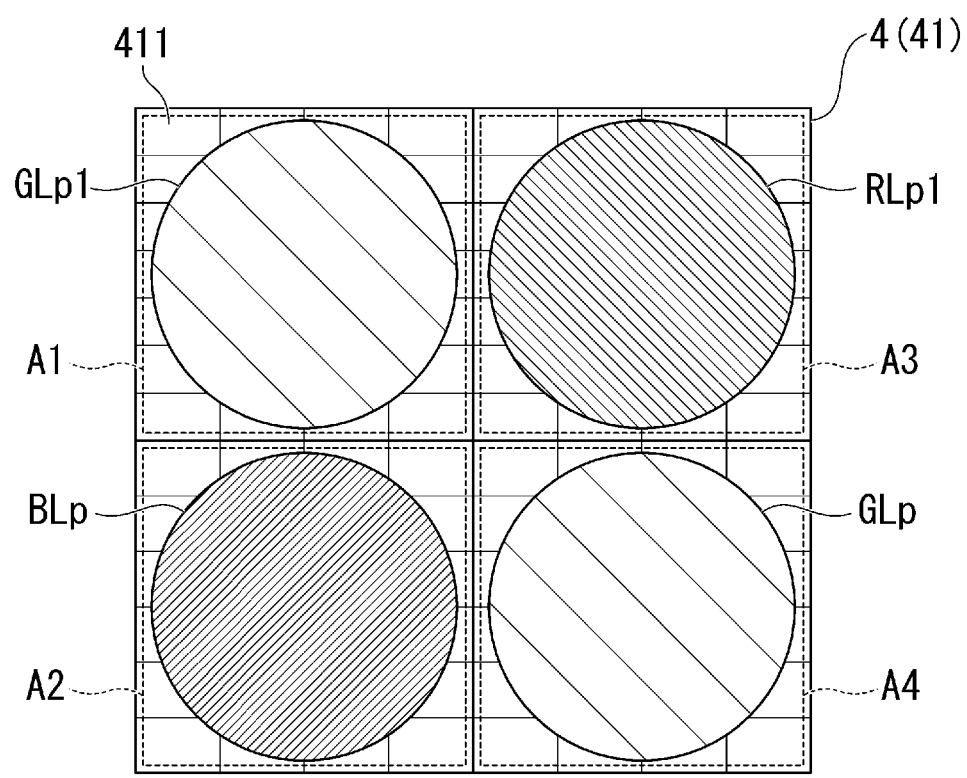
FIG. 9 is a diagrammatic view showing color luminous flux incident positions on a multi-lens.
Figure 9:
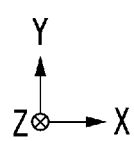

FIG. 9 is a diagrammatic view showing the color luminous flux incident positions on the first multi-lens 41 viewed in the direction −Z.

The green light GLp1, the blue light BLp, the red light RLp1, and the green light GLp outputted from the light source apparatus 2 enter the first multi-lens 41, as shown in FIG. 9. The green light GLp1 outputted from the light source apparatus 2 via the position shifted in the directions −X and +Y enters a plurality of lenses 411 contained in an area A1 of the first multi-lens 41 that is the area shifted in the directions −X and +Y. The blue light BLp outputted from the light source apparatus 2 via the position shifted in the directions −X and −Y enters a plurality of lenses 411 contained in an area A2 of the first multi-lens 411 that is the area shifted in the directions −X and −Y.

The red light RLp1 outputted from the light source apparatus 2 via the position shifted in the directions +X and +Y enters a plurality of lenses 411 contained in an area A3 of the first multi-lens 41 that is the area shifted in the directions +X and +Y. The green light GLp outputted from the light source apparatus 2 via the position shifted in the directions +X and −Y enters a plurality of lenses 411 contained in an area A4 of the first multi-lens 41 that is the area shifted in the directions +X and −Y. The color luminous fluxes having entered the lenses 411 form a plurality of sub-luminous fluxes, which enter lenses 421 of the second multi-lens 42 that correspond to the lenses 411.

Out of the light L outputted from the light source apparatus 2 according to the present embodiment, the green light GLp1 corresponds to the fourth light in the appended claims, the blue light BLp corresponds to the fifth light in the appended claims, the red light RLp1 corresponds to the sixth light in the appended claims, and the green light GLp corresponds to the seventh light in the appended claims.

The second multi-lens 42 includes a plurality of lenses 421 arranged in a matrix in a plane perpendicular to the illumination optical axis Ax and corresponding to the plurality of lenses 411 of the first multi-lens 41, as shown in FIG. 1. The lenses 421 receive the plurality of sub-luminous fluxes having exited out of the lenses 411 corresponding to the lenses 421. The lenses 421 cause the sub-luminous fluxes incident thereon to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause the green light GLp1, the blue light BLp, the red light RLp1, and the green light GLp, which have each been divided into a plurality of sub-luminous fluxes, to enter a plurality of microlenses 621, which form a microlens array 62, which will be described later, of the light modulator 6 via the field lens 5, at different angles.

Configuration of Light Modulator

The light modulator 6 modulates the light outputted from the light source apparatus 2, as shown in FIG. 1. In detail, the light modulator 6 modulates the color luminous fluxes outputted from the light source apparatus 2 and incident on the light modulator 6 via the homogenizer 4 and the field lens 5 in accordance with image information to form image light according to the image information. The light modulator 6 includes one liquid crystal panel 61 and one microlens array 62.

Configuration of Liquid Crystal Panel

Figure 10:
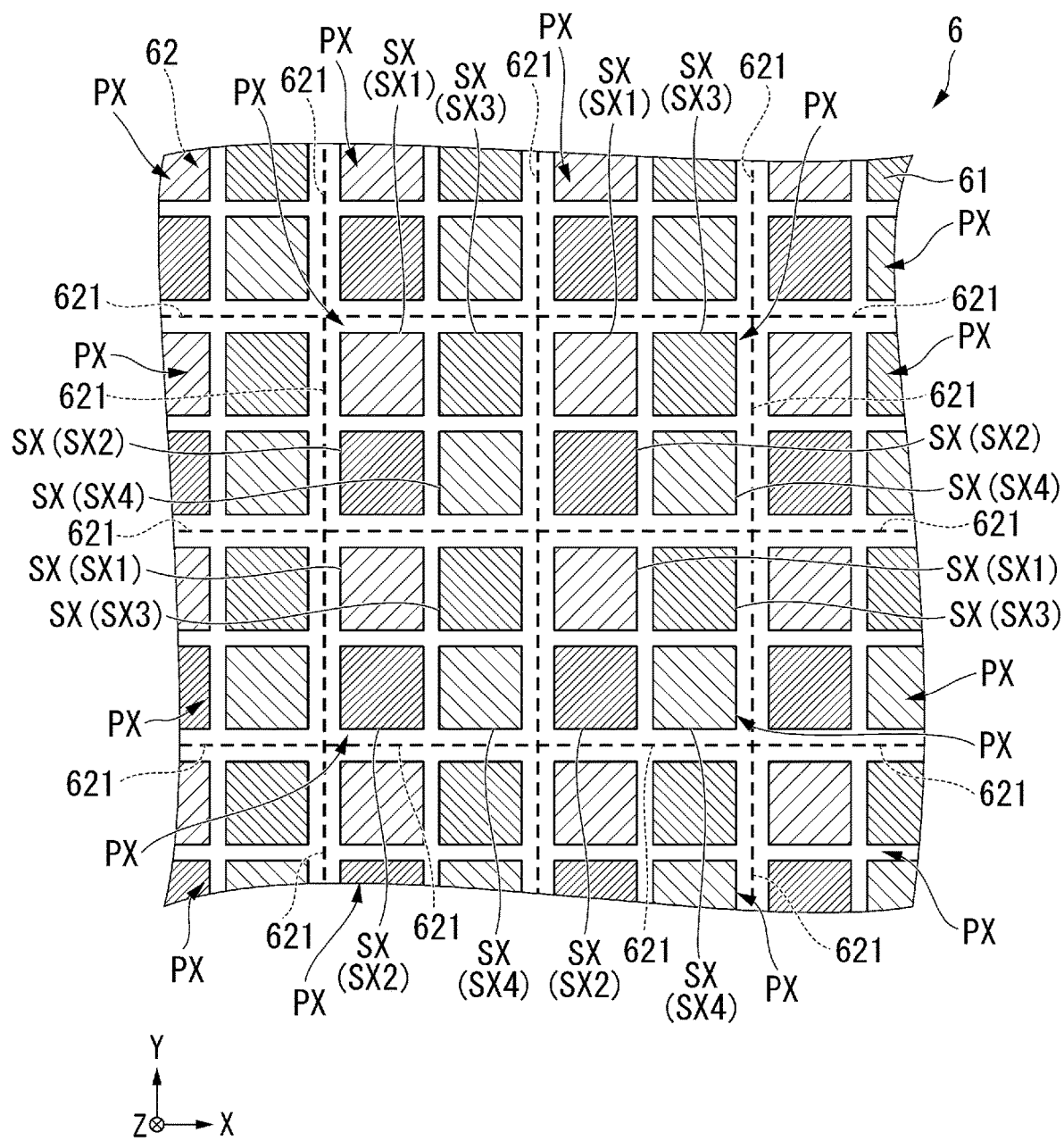
FIG. 10 is an enlarged view of a light modulator.

FIG. 10 is a diagrammatic enlarged view of part of the light modulator 6 viewed in the direction −Z. In other words, FIG. 10 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the illumination optical axis Ax, as shown in FIG. 10.

The pixels PX each have a plurality of sub-pixels SX, which modulate color luminous fluxes having different colors from one another. In the present embodiment, the pixels PX each have four sub-pixels SX (SX1 to SX4). Specifically, in one pixel PX, a first sub-pixel SX1 is disposed in a position shifted in the directions −X and +Y. A second sub-pixel SX2 is disposed in a position shifted in the directions −X and −Y. A third sub-pixel SX3 is disposed in a position shifted in the directions +X and +Y. A fourth sub-pixel SX4 is disposed in a position shifted in the directions +X and −Y.

Configuration of Microlens Array

The microlens array 62 is provided in a position shifted in the direction −Z, which is the direction facing the light incident side, from the liquid crystal panel 61, as shown in FIG. 1. The microlens array 62 guides the color luminous fluxes that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the illumination optical axis Ax, as shown in FIG. 10. In other words, the plurality of microlenses 621 are arranged in a matrix in a plane perpendicular to the center axis of the light incident from the field lens 5. In the present embodiment, one microlens 621 is provided in correspondence with two sub-pixels arranged in the direction +X and two sub-pixels arranged in the direction +Y. That is, one microlens 621 is provided in correspondence with four sub-pixels SX1 to SX4, which are arranged in two rows and two columns in the plane XY.

The green light GLp1, the blue light BLp, the red light RLp1, and the green light GLp superimposed on one another by the homogenizer 4 are incident on each of the microlenses 621 at angles different from one another. The microlenses 621 each cause each of the color luminous fluxes incident on the microlens 621 to be incident on the sub-pixel SX corresponding to the color luminous flux. Specifically, the microlenses 621 each cause the green light GLp1 to be incident on the first sub-pixel SX1, the blue light BLp to be incident on the second sub-pixel SX2, the red light RLp1 to be incident on the third sub-pixel SX3, and the green light GLp to be incident on the fourth sub-pixel SX4 among the sub-pixels SX of the pixel PX corresponding to the microlens 621. The sub-pixels SX1 to SX4 thus receive the color luminous fluxes corresponding to the sub-pixels SX1 to SX4 and modulate the corresponding color luminous fluxes. The image light thus modulated by the liquid crystal panel 61 is projected by the projection optical apparatus 7 onto the projection receiving surface that is not shown.

Effects of First Embodiment

In the related-art projector described in JP-A-4-60538, a lamp is used as the light source. Since the light outputted from the lamp does not have an aligned polarization direction, using a liquid crystal panel as the light modulator requires a polarization conversion section that achieves an aligned polarization direction. The projector typically uses a polarization conversion section including a multi-lens array and a polarization separator (PBS) array. To reduce the size of the projector, a small-interval multi-lens array and a small-interval PBS array are required, but it is very difficult to produce a small-interval PBS array.

To address the problem, in the present embodiment, a plurality of color luminous fluxes having an aligned polarization direction, that is, the P-polarized green light GLp1, the P-polarized blue light BLp, the P-polarized red light RLp1, and the P-polarized green light GLp, are outputted from the light source apparatus 2. According to the configuration described above, a light source apparatus 2 capable of outputting a plurality of color luminous fluxes spatially separated from one another and having an aligned polarization direction can be achieved without using a small-interval polarization converter, such as that described above. The size of the light source apparatus 2 can thus be reduced, and the size of the projector 1 can in turn be reduced.

The light source apparatus 2 according to the present embodiment includes the light source section 21, which outputs the blue light BL, which has the blue wavelength band and contains the P-polarized blue light BLp and the S-polarized blue light BLs, and the red light RLp, the first optical member 22, which transmits in the direction +X the blue light BLp incident from the light source section 21 along the direction +X, reflects in the direction −Z the blue light BLs incident from the light source section 21 along the direction +X, and transmits in the direction +X the red light RLp incident from the light source section 21 along the direction +X, the second optical member 23, which is disposed in a position shifted in the direction +X from the first optical member 22, reflects in the direction −Z the blue light BLp incident from the first optical member 22 along the direction +X, and transmits in the direction +X the Red light RLp incident from the first optical member 22 along the direction +X, the diffuser plate 261, which is disposed in a position shifted in the direction −Z from the first optical member 22, diffuses the blue light BLc1 incident from the first optical member 22 along the direction −Z, and emits the diffused blue light BLc2 in the direction +Z, the wavelength converter 28, which is disposed in a position shifted in the direction −Z from the second optical member 23, converts in terms of wavelength the blue light BLp incident from the second optical member 23 along the direction −Z, and emits the green light GL in the direction +Z, and the diffuser plate 361, which is disposed in a position shifted in the direction +X from the second optical member 23, diffuses the red light RLp incident from the second optical member 23 along the direction +X, and emits the diffused red light RLp in the direction −X. The second optical member 23 receives the green light GL from the wavelength converter 28 along the direction +Z, transmits the green light GLp in the direction +Z, and reflects the green light GLs in the direction −X. The first optical member 22 transmits the blue light BLc2 emitted from the diffuser plate 261 along the direction +Z and reflects in the direction +Z the green light GLs incident from the second optical member 23 along the direction −X. The second optical member 23 reflects in the direction +Z the red light RLp emitted from the diffuser plate 361 along the direction −X.

The light source apparatus 2 according to the present embodiment can generate the red light RLp1 by using the red laser light outputted from the light source section 21. The thus generated red light RLp1 has an increased amount of red component and an improved color gamut associated with the red light as compared with red light generated by separation of yellow fluorescence. The light source apparatus 2 according to the present embodiment can therefore improve the color reproducibility of the red component of a projected image.

Furthermore, in the projector 1 according to the present embodiment, since the green light is incident on two of the four sub-pixels SX of the light modulator 6, the sub-pixels SX2 and SX3, the amount of green light incident on the pixels PX can be increased. The visual sensitivity of a projected image can thus be increased.

The light source apparatus 2 according to the present embodiment further includes the first retardation element 24, which is provided between the first optical member 22 and the diffuser plate 261 and on which the blue light BLs is incident from the first optical member 22 along the direction −Z.

According to the configuration described above, since the first retardation element 24 is provided between the first optical member 22 and the first diffuser 26, the circularly polarized blue light BLc2 emitted from the first diffuser 26 can be converted into the P-polarized blue light BLp, which can pass through the first optical member 22. The blue light BLc2 emitted from the first diffuser 26 can thus be used more efficiently.

The light source apparatus 2 according to the present embodiment further includes the second retardation element 34, which is provided between the second optical member 23 and the second diffuser 36 and on which the red light RLp is incident from the second optical member 23 along the direction +X.

According to the configuration described above, since the second retardation element 34 is provided between the second optical member 23 and the second diffuser 36, the circularly polarized red light RLc2 emitted from the second diffuser 36 can be converted into the P-polarized red light RLs, which can be reflected off the second optical member 23. The red light RLc2 emitted from the second diffuser 36 can thus be used more efficiently.

In the light source apparatus 2 according to the present embodiment, the light source section 21 includes the blue light emitters 213, the red light emitters 214, and the third retardation element 2191, on which the light outputted from the blue light emitters 213 is incident and out of which the blue light BL exits. Furthermore, in the present embodiment, the light source section 21 has a package structure in which the blue light emitter 213 and the red light emitters 214 are mounted on the substrate 212.

According to the configuration described above, since the light source section 21 includes the third retardation element 2191, the blue light BL containing the P-polarized blue light BLp and the S-polarized blue light BLs can be reliably incident on the first optical member 22. Furthermore, the configuration described above allows the blue light emitter 213 and the red light emitters 214 to be implemented in a single package, whereby the configuration of the light source section 21 can be downsized. The size of the light source apparatus 2 itself can therefore be reduced.

The light source apparatus 2 according to the present embodiment further includes the first color separator 29, which is disposed in a position shifted in the direction +Z from the first optical member 22 and separates the light having exited out of the first optical member 22 into the green light GLp1 and the blue light BLp, and the second color separator 33, which is disposed in a position shifted in the direction +Z from the second optical member 23 and separates the light having exited out of the second optical member 23 into the red light RLp1 and the green light GLp.

According to the configuration described above, the green light GLp1, the blue light BLp, the red light RLp1, and the green light GLp can be outputted from the light source apparatus 2.

In the present embodiment, since the fourth retardation element 30 is disposed in the optical path of the green light GLs having exited out of the dichroic prism 291, the green light GLs can be converted into the P-polarized green light GLp1. The green light GLp1 and the blue light BLp that exit out of the first color separator 29 can each be light formed of the P-polarized component.

In the present embodiment, since the fifth retardation element 32 is disposed in the optical path of the red light RLs having exited out of the dichroic prism 331, the red light RLs can be converted into the P-polarized red light RLp1. The red light RLp1 and the green light GLp that exit out of the second color separator 33 can each be light formed of the P-polarized component.

The green light GLp1, the blue light BLp, the red light RLp1, and the green light GLp outputted from the light source apparatus 2 can therefore each be light formed of the P-polarized component.

In the present embodiment, since the light source apparatus 2 includes the first light collector 25, which collects the blue light BLs toward the first diffuser 26, the first light collector 25 can efficiently collect the blue light BLc1 having exited out of the first retardation element 24 on the first diffuser 26 and can also substantially parallelize the blue light BLc2 emitted from the first diffuser 26. Loss of the blue light BLs can thus be suppressed, whereby the blue light BLs can be used more efficiently.

In the present embodiment, since the light source apparatus 2 includes the second light collector 27, which collects the red light RLp toward the second diffuser 36, the second light collector 27 can efficiently collect the red light RLp having exited out of the second optical member 23 on the second diffuser 36 and can also substantially parallelize the red light RLc2 emitted from the second diffuser 36. Loss of the red light RLs can thus be suppressed, whereby the red light RLs can be used more efficiently.

In the present embodiment, since the light source apparatus 2 includes the third light collector 35, which collects the blue light BLp toward the wavelength converter 28, the third light collector 35 can efficiently collect the blue light BLp having exited out of the second optical member 23 on the wavelength converter 28 and can also parallelize the green light GL emitted from the wavelength converter 28. Loss of the blue light BLp and the green light GL can thus be suppressed, whereby the blue light BLp and the green light GL can be used more efficiently.

The blue light BLc2 emitted from the first diffuser 26 is substantially parallelized by the first light collector 25, but part of the blue light BLc2 diverges and is incident on the first optical member 22, as described above. The red light RLc2 emitted from the second diffuser 36 is substantially parallelized by the second light collector 27, but part of the red light RLc2 diverges and is incident on the second optical member 23. Similarly, the green light GL emitted from the wavelength converter 28 is substantially parallelized by the third light collector 35, but part of the green light GL diverges and is incident on the second optical member 23.

On the other hand, the light source apparatus 2 according to the present embodiment further includes the first mirror 141, which is disposed in a position shifted in the direction +Y from the first optical member 22 and the second optical member 23, and the second mirror 142, which is provided so as to face the first mirror 141 and disposed in a position shifted in the direction −Y from the first optical member 22 and the second optical member 23.

The light source apparatus 2 according to the present embodiment includes the mirror unit 40, which sandwiches the first optical member 22 and the second optical member 23 in the direction Y, whereby the light having spread in the direction Y is reflected off the first mirror 141 and the second mirror 142 and can then be captured by the first optical member 22 or the second optical member 23.

The plate-shaped first optical member 22 and second optical member 23 can thus efficiently capture the light emitted from the first diffuser 26, the second diffuser 36, and the wavelength converter 28.

In the present embodiment, since the projector 1 includes the homogenizer 4 located between the light source apparatus 2 and the light modulator 6, the light modulator 6 can be uniformly illuminated with the blue light BLp, the green light GLp1, the green light GLp, and the red light RLp1 outputted from the light source apparatus 2. Unevenness in color and brightness of a projected image can thus be suppressed.

In the present embodiment, since the light modulator 6 includes the microlens array 62 including the plurality of microlenses 621 corresponding to the plurality of pixels PX, the microlenses 621 allow the four color luminous fluxes incident on the light modulator 6 to be incident on the corresponding four sub-pixels SX of the liquid crystal panel 61. The color luminous fluxes outputted from the light source apparatus 2 can thus be efficiently incident on the sub-pixels SX, whereby the color luminous fluxes can be used more efficiently.

Second Embodiment

A second embodiment of the present disclosure will be described below with reference to FIGS. 11 to 14.

The basic configuration of the light source apparatus according to the second embodiment is the same as that according to the first embodiment, but the second embodiment differs from the first embodiment in terms of layout of the first diffuser 26 and the second diffuser 36. The entire light source apparatus will therefore not be described.

Figure 11:
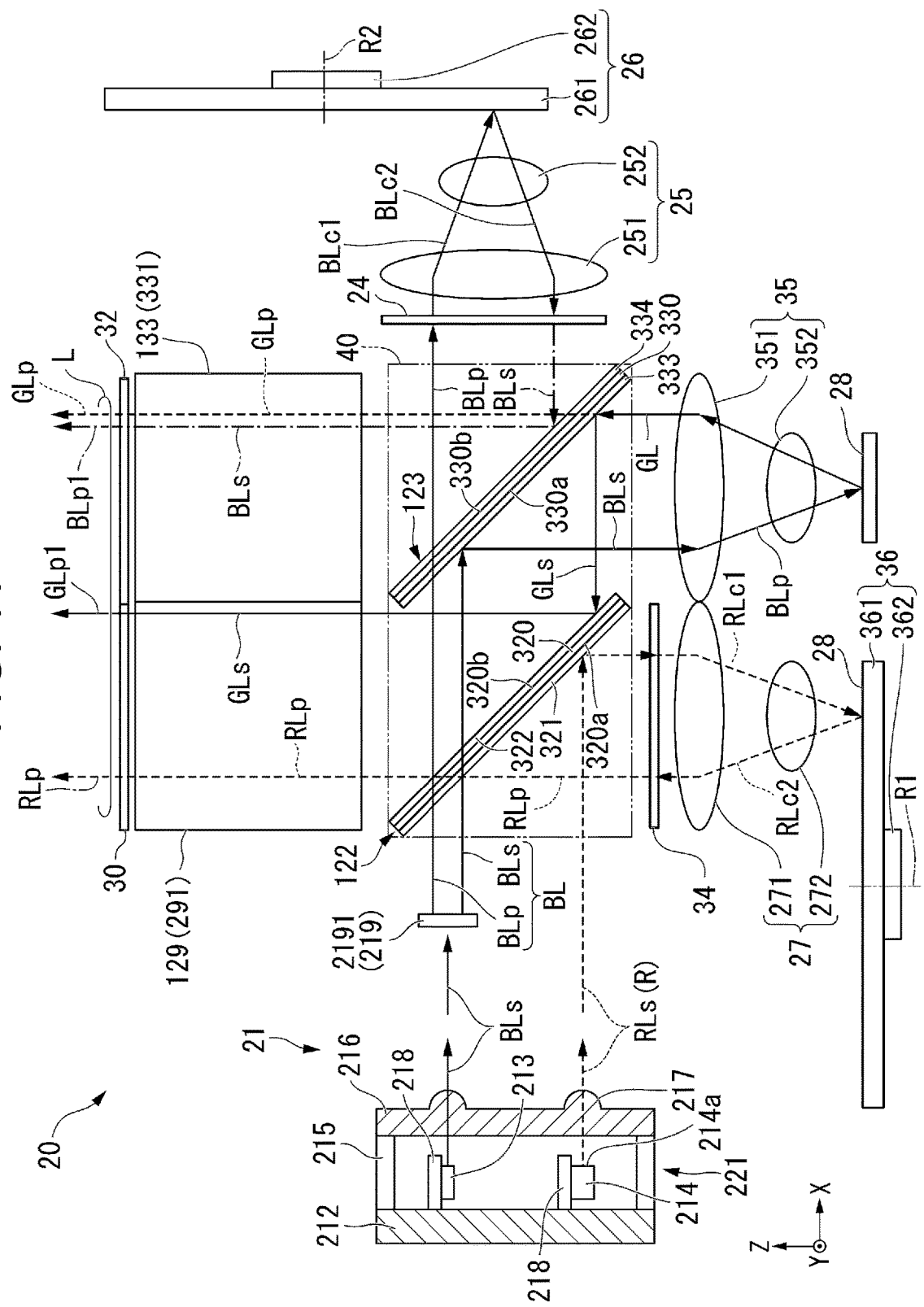
FIG. 11 is a plan view of key parts of the light source apparatus according to a second embodiment viewed in the direction +Y.

FIG. 11 is a plan view of key parts of the light source apparatus according to the second embodiment viewed in the direction +Y.

In FIG. 11, components common to those in the figures used in the first embodiment have the same reference characters and will not be described.

A light source apparatus 20 according to the present embodiment includes the light source section 21, a first optical member 122, a second optical member 123, the first retardation element 24, the first light collector 25, the first diffuser 26, the second retardation element 34, the second light collector 27, the second diffuser 36, a first color separator 129, a second color separator 133, the fourth retardation element 30, the fifth retardation element 32, the third light collector 35, the wavelength converter 28, and the mirror unit 40, as shown in FIG. 11.

The light source section 21 in the present embodiment outputs the blue light BL and the red light RLs from the light source 211. The light source 211 in the present embodiment includes a plurality of red light emitters 214 so implemented along the axis Y that the lengthwise direction of each of the light emission surfaces 214a coincides with the direction Z. That is, in the light source 211 in the present embodiment, the red light emitters 214 are each rotated by 90° around the light exiting optical axis of the red light emitter 214, unlike the red light emitters 214 in the first embodiment. In this case, the red beam R outputted from each of the red light emitters 214 has an elliptical shape having a major axis extending in the direction Y. That is, in the light source 211 in the present embodiment, the red light emitters 214 are each implemented so as to output light formed of the S-polarized component as the red beam R. The light source 211 in the present embodiment therefore outputs the S-polarized red light RLs formed of the red beams R outputted from the plurality of red light emitters 214.

In the light source section 21 in the present embodiment, the blue light emitters 213 may be disposed so as to output the S-polarized or P-polarized component, because the movable retarder 219 can arbitrarily set the ratio between the amount of S-polarized light and the amount of P-polarized light contained in the blue light BL.

In the light source apparatus 20 according to the present embodiment, the positional relationship of the first diffuser 26 and the second diffuser 36 to the first optical member 122 and the second optical member 123 is changed from the positional relationship of the first diffuser 26 and the second diffuser 36 to the first optical member 22 and the second optical member 23 in the light source apparatus 2 of the first embodiment. That is, in the light source apparatus 20 according to the present embodiment, the first diffuser 26 is disposed in a position shifted in the direction +X from the second optical member 123, and the second diffuser 36 is disposed in a position shifted in the direction −Z from the first optical member 122.

The first optical member 122 in the present embodiment includes a first transparent substrate 320, a first optical layer 321, and a second optical layer 322. The first optical layer 321 is formed at a first surface 320a of the first transparent substrate 320. The first optical layer 321 is disposed so as to face the light source section 21 and inclines by 45° with respect to the planes XY and YZ.

The first optical layer 321 in the present embodiment is characterized in that it transmits the blue light BL irrespective of the polarization direction thereof. The first optical layer 321 therefore transmits along the direction +X the P-polarized blue light BLp and the S-polarized blue light BLs contained in the blue light BL incident along the direction +X. The first optical layer 321 further has a polarization separation characteristic that causes the first optical layer 321 to transmit the P-polarized component and reflect the S-polarized component out of light having the red wavelength band. The first optical layer 321 therefore reflects in the direction −Z the S-polarized red light RLs incident along the direction +X. The first optical layer 321 is formed, for example, of a dielectric multilayer film.

The second optical layer 322 is formed at a second surface 320b of the first transparent substrate 320. The second optical layer 322 is formed of a dichroic mirror optically characterized in that it transmits light having the blue wavelength band and light having the red wavelength band and reflects light having the green wavelength band. The second optical layer 322, which is formed of the dichroic mirror, allows precise separation of the light incident thereon based on reflection or transmission the incident light without using polarization.

The blue light BL having passed through the first optical layer 321 passes through the first transparent substrate 220 and the second optical layer 322 and exits in the direction +X.

The first optical member 122 having the configuration described above can transmit in the direction +X the blue light BL incident from the light source section 21 along the direction +X and reflect in the direction −Z the S-polarized red light RLs incident from the light source section 21 along the direction +X.

Since the first optical member 122 in the present embodiment is a plate-shaped polarization separator, the function of the first optical layer 321 and the function of the second optical layer 322 can be designed separately, whereby the first optical layer 321 and the second optical layer 322 are each relatively readily designed as a film.

The second optical member 123 is disposed in a position shifted in the direction +X from the first optical member 122. The blue light BL having passed through the first optical member 122 is incident on the second optical member 123. The second optical member 123 is formed of a plate-shaped polarization separator, as the first optical member 122 is.

The second optical member 123 includes a second transparent substrate 330, a third optical layer 333, and a fourth optical layer 334. A third surface 330a of the second transparent substrate 330 and the second surface 320b of the first transparent substrate 320 face each other. The third optical layer 333 is formed at the third surface 330a of the second transparent substrate 330. The third optical layer 333 is disposed so as to face the second optical layer 322 and inclines by 45° with respect to the planes XY and YZ.

The third optical layer 333 has a polarization separation characteristic that causes the third optical layer 333 to transmit the P-polarized component and reflect the S-polarized component out of the blue light BL. The third optical layer 333 therefore transmits the P-polarized blue light BLp in the direction +X and reflects the S-polarized blue light BLs in the direction −Z out of the blue light BL incident on the third optical layer 333 along the direction +X. The third optical layer 333 further has a polarization separation characteristic that causes the third optical layer 333 to transmit the P-polarized component and reflect the S-polarized component out of light having the green wavelength band. The third optical layer 333 is formed, for example, of a dielectric multilayer film.

The fourth optical layer 334 is formed at a fourth surface 330b of the second transparent substrate 330. The fourth optical layer 334 is optically characterized in that it transmits at least the P-polarized component of light having the green wavelength band. The fourth optical layer 334 further has a polarization separation characteristic that causes the fourth optical layer 334 to transmit the P-polarized component and reflect the S-polarized component of light having the blue wavelength band. The fourth optical layer 334 is formed, for example, of a dielectric multilayer film. When a film optically characterized in that it reflects the S-polarized component of light having the blue wavelength band is used as the third optical layer 333, the fourth optical layer 334 can be formed of a simple AR coating.

The second optical member 123 having the configuration described above can transmit the P-polarized blue light BLp in the direction +X and reflect the S-polarized blue light BLs in the direction −Z out of the blue light BL incident from the first optical member 122 along the direction +X.

Since the second optical member 123 in the present embodiment is a plate-shaped polarization separator, the function of the third optical layer 333 and the function of the fourth optical layer 334 can be designed separately, whereby the third optical layer 333 and the fourth optical layer 334 are each relatively readily designed as a film.

The first retardation element 24 is disposed in a position shifted in the direction +X from the second optical member 123. That is, the first retardation element 24 is disposed on the axis X between the second optical member 123 and the first diffuser 26. The P-polarized blue light BLp incident from the second optical member 123 along the direction +X is incident on the first retardation element 24. The first light collector 25 is disposed in a position shifted in the direction −X from the first retardation element 24.

In the present embodiment, the P-polarized blue light BLp having passed through the second optical member 123 in the direction +X is converted by the first retardation element 24 into, for example, left-handed circularly polarized blue light BLc1, which is then incident on the diffuser plate 261 of the first diffuser 26 via the first light collector 25. The left-handed circularly polarized blue light BLc1 incident on the diffuser plate 261 is reflected off the diffuser plate 261 and converted into right-handed circularly polarized blue light BLc2. The blue light BLc2 emitted from the first diffuser 26 is incident on the first retardation element 24 again via the first light collector 25 and is converted by the first retardation element 24 into the S-polarized blue light BLs. The converted blue light BLs is incident on the second optical member 123. The blue light BLs is reflected in the direction +Z off the fourth optical layer 334 of the second optical member 123. The converted blue light BLs thus exits out of the second optical member 123 in the direction +Z.

The second retardation element 34 is disposed in a position shifted in the direction +X from the second optical member 123. That is, the second retardation element 34 is disposed on the axis Z between the first optical member 122 and the second diffuser 36. The S-polarized red light RLs is incident from the first optical member 122 on the second retardation element 34 along the direction −Z. The second light collector 27 is disposed in a position shifted in the direction −Z from the second retardation element 34.

In the present embodiment, the S-polarized red light RLs reflected off the first optical member 122 in the direction −Z is converted by the second retardation element 34 into, for example, right-handed circularly polarized red light RLc1, which is then incident on the diffuser plate 361 of the second diffuser 36 via the second light collector 27. The right-handed circularly polarized red light RLc1 incident on the diffuser plate 361 is reflected off the diffuser plate 361 and converted into left-handed circularly polarized red light RLc2. The red light RLc2 emitted from the second diffuser 36 is incident on the second retardation element 34 again via the second light collector 27 and is converted by the second retardation element 34 into the P-polarized red light RLp. The converted red light RLp is incident on the first optical member 122. The converted red light RLp thus exits out of the first optical member 122 in the direction +Z.

In the present embodiment, the green light GL emitted from the wavelength converter 28 is separated by the second optical member 123 into the P-polarized green light GLp and the S-polarized green light GLs, as in the first embodiment. Thereafter, the S-polarized green light GLs exits out of the first optical member 122 in the direction +Z, and the P-polarized green light GLp exits out of the second optical member 123 in the direction +Z.

Figure 12:
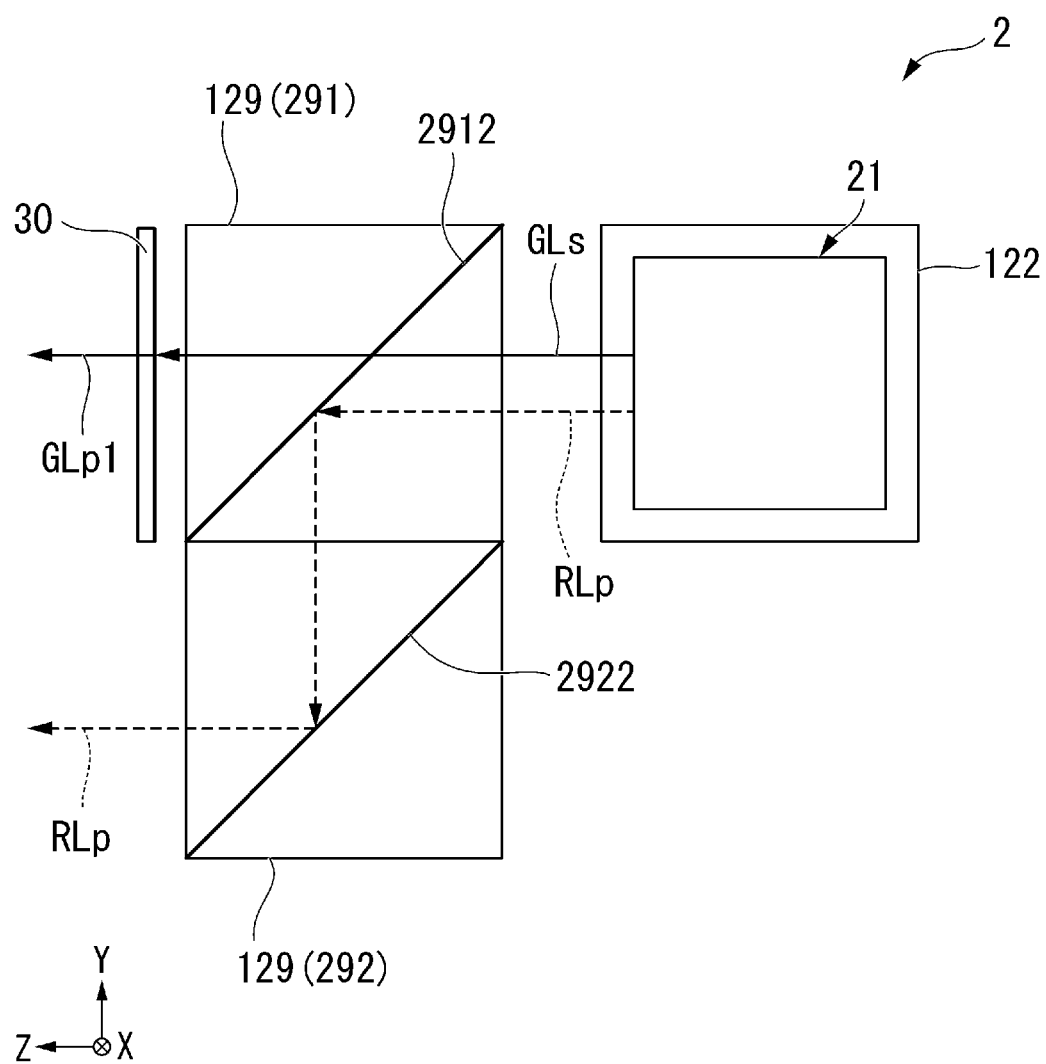
FIG. 12 is a side view of the light source apparatus according to the second embodiment viewed in the direction −X.

FIG. 12 is a side view of the light source apparatus 20 viewed in the direction −X. That is, FIG. 12 shows the first color separator 129 and the fourth retardation element 30, and other components viewed in the direction −X. In FIG. 12, the second retardation element 34, the second light collector 27, the second diffuser 36, and other components are omitted for ease of illustration.

The first color separator 129 is disposed in a position shifted in the direction +Z from the first optical member 122, as shown in FIG. 12. The first color separator 129 includes the dichroic prism 291 and the reflection prism 292. The first color separator 129 separates the light having exited out of the first optical member 122 in the direction +Z into the green light GLs and the red light RLp.

The light containing the green light GLs and the red light RLp having exited out of the first optical member 122 enters the dichroic prism 291. The dichroic prism 291 includes a color separation layer 2912. The color separation layer 2912 functions as a dichroic mirror that reflects the red light component and transmits the green light component of the light incident on the color separation layer 2912. Therefore, out of the light having entered the dichroic prism 291 from the first optical member 122, the green light GLs passes through the color separation layer 2912 in the direction +Z and exits out of the dichroic prism 291, and the red light RLp is reflected off the color separation layer 2912 in the direction −Y.

In the present embodiment, the red light RLp is light formed of the S-polarized component with respect to the color separation layer 2912, and the green light GLs is light formed of the P-polarized component with respect to the color separation layer 2912. That is, the color separation layer 2912 in the present embodiment only needs to be designed so as to reflect the red light RLp incident as light formed of the S-polarized component and transmit the green light GLs incident as light formed of the P-polarized component, whereby the color separation layer 2912 is readily designed as a film.

The red light RLp reflected off the color separation layer 2912 is reflected in the direction +Z off a reflection layer 2922 of the reflection prism 292. The red light RLp reflected off the reflection layer 2922 exits out of the reflection prism 292 in the direction +Z.

The green light GLs having exited out of the dichroic prism 291 is incident on the fourth retardation element 30. The fourth retardation element 30 in the present embodiment converts the green light GLs into the P-polarized green light GLp1. The converted P-polarized green light GLp1 from the fourth retardation element 30 is outputted in the direction +Z from the light source apparatus 2 and enters the homogenizer 4 shown in FIG. 1.

The green light GLp1 exits via a light exiting position separate in the direction +Y from the light exiting position via which the red light RLp exits out of the light source apparatus 2 and enters the homogenizer 4.

Figure 13:
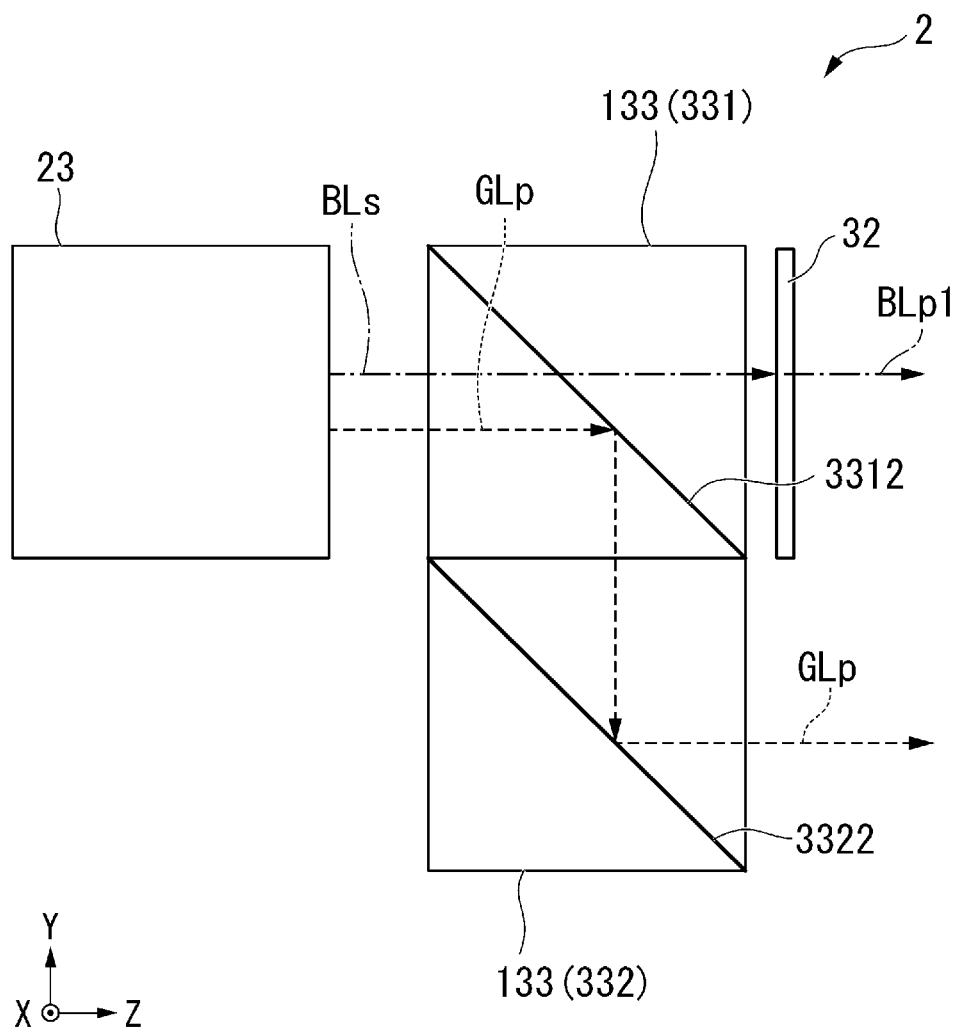
FIG. 13 is a side view of the light source apparatus according to the second embodiment viewed in the direction +X.
Figure 14:
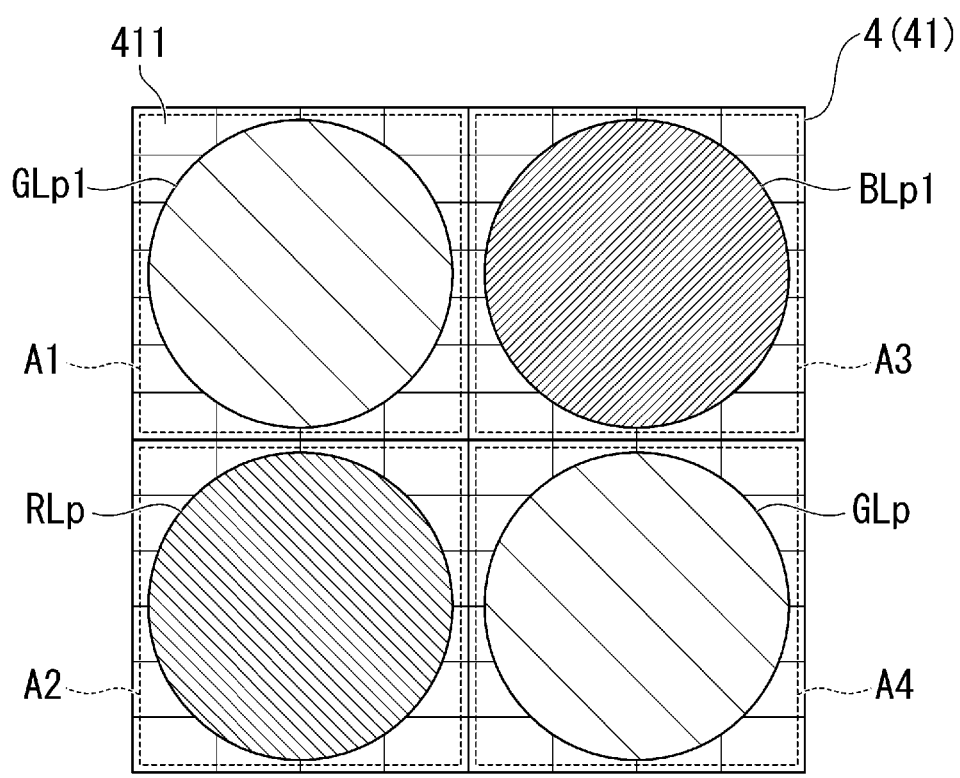
FIG. 14 is a diagrammatic view showing the color luminous flux incident positions on the multi-lens in the second embodiment.

FIG. 13 is a side view of the light source apparatus 20 viewed in the direction +X. FIG. 14 is a diagrammatic view showing the color luminous flux incident positions on the multi-lens. In other words, FIG. 13 shows the fifth retardation element 32 and the second color separator 133 viewed in the direction +X. In FIG. 13, the first diffuser 26, the third light collector 35, and the wavelength converter 28 are omitted.

The second color separator 133 is disposed in a position shifted in the direction +Z from the second optical member 123, as shown in FIG. 13. The second color separator 133 includes the dichroic prism 331 and the reflection prism 332. The second color separator 133 separates the light having exited in the direction +Z out of the second optical member 123 into the blue light BLs and the green light GLp.

The dichroic prism 331 has the same configuration as that of the dichroic prism 291 and includes a color separation layer 3312. The color separation layer 3312 functions as a dichroic mirror that reflects the green light component and transmits the blue light component of the light incident on the color separation layer 3312. Therefore, out of the light having entered the dichroic prism 331 from the second optical member 123, the blue light BLs passes through the color separation layer 3312 in the direction +Z and exits out of the dichroic prism 331, and the green light GLP is reflected off the color separation layer 3312 in the direction −Y.

In the present embodiment, the green light GLp is light formed of the S-polarized component with respect to the color separation layer 3312, and the blue light BLs is light formed of the P-polarized component with respect to the color separation layer 3312. That is, the color separation layer 3312 in the present embodiment only needs to be designed so as to reflect the green light GLp incident as light formed of the S-polarized component and transmit the blue light BLs incident as light formed of the P-polarized component, whereby the color separation layer 3312 is readily designed as a film.

The green light GLp reflected off the color separation layer 3312 is reflected in the direction +Z off a reflection layer 3322 of the reflection prism 332. The green light GLp reflected off the reflection layer 3322 exits out of the reflection prism 332 in the direction +Z.

The blue light BLs having exited out of the dichroic prism 331 is incident on the fifth retardation element 32. The fifth retardation element 32 in the present embodiment converts the blue light BLs into the P-polarized blue light BLp1. The converted P-polarized blue light BLp1 from the fifth retardation element 32 is outputted from the light source apparatus 2 in the direction +Z and enters the homogenizer 4 shown in FIG. 1.

The blue light BLp1 exits via a light exiting position separate in the direction +Y from the light exiting position via which the green light GLp exits out of the light source apparatus 20 and enters the homogenizer 4.

The light source apparatus 20 according to the second embodiment outputs the green light GLp1, the red light RLp1, the blue light BLp1, and the green light GLp, as shown in FIG. 14. The green light GLp1 enters the plurality of lenses 411 arranged in the area A1 of the first multi-lens 41, which is the area shifted in the directions −X and +Y. The red light RLp1 enters the plurality of lenses 411 arranged in the area A2 of the first multi-lens 41, which is the area shifted in the directions −X and −Y. The blue light BLp1 enters the plurality of lenses 411 arranged in the area A3 of the first multi-lens 41, which is the area shifted in the directions +X and +Y. The green light GLp enters the plurality of lenses 411 arranged in the area A4 of the first multi-lens 41, which is the area shifted in the directions +X and −Y. The color luminous fluxes having entered the lenses 411 form a plurality of sub-luminous fluxes, which enter lenses 421 of the second multi-lens 42 that correspond to the lenses 411.

Out of the light L outputted from the light source apparatus 20 according to the present embodiment, the green light GLp1 corresponds to the fourth light in the appended claims, the red light RLp1 corresponds to the fifth light in the appended claims, the blue light BLp1 corresponds to the sixth light in the appended claims, and the green light GLp corresponds to the seventh light in the appended claims.

Effects of Second Embodiment

The light source apparatus 20 according to the present embodiment includes the light source section 21, which outputs the blue light BL, which has the blue wavelength band and contains the P-polarized blue light BLp and the S-polarized blue light BLs, and the red light RLs, the first optical member 122, which transmits in the direction +X the blue light BL incident from the light source section 21 along the direction +X and reflects in the direction −Z the red light RLs incident from the light source section 21 along the direction +X, the second optical member 123, which is disposed in a position shifted in the direction +X from the first optical member 122, transmits in the direction +X the blue light BLp incident from the first optical member 122 along the direction +X, and reflects in the direction −Z the blue light BLs incident from the first optical member 122 along the direction +X, the diffuser plate 261, which is disposed in a position shifted in the direction +X from the second optical member 123, diffuses the blue light BLc1 incident from the second optical member 123 along the direction +X, and emits the diffused blue light BLc2 in the direction −X, the wavelength converter 28, which is disposed in a position shifted in the direction −Z from the second optical member 123, converts in terms of wavelength the blue light BLp incident from the second optical member 123 along the direction −Z, and emits the green light GL in the direction +Z, and the diffuser plate 361, which is disposed in a position shifted in the direction −Z from the first optical member 122, diffuses the red light RLc1 incident from the first optical member 122 along the direction −Z, and emits the diffused red light RLc1 in the direction +Z. The second optical member 123 receives the green light GL from the wavelength converter 28 along the direction +Z, transmits the green light GLP in the direction +Z, and reflects the green light GLs in the direction −X. The first optical member 122 transmits the red light RLc2 emitted from the diffuser plate 361 along the direction +Z and reflects in the direction +Z the green light GLs incident from the second optical member 23 along the direction −X. The second optical member 23 reflects in the direction +Z the blue light BLs emitted from the diffuser plate 261 along the direction −X.

The present embodiment also provides the same effects as those provided by the first embodiment, for example, a light source apparatus 20 capable of outputting a plurality of color luminous fluxes having an aligned polarization direction can be achieved without using a small-interval polarization converter, and the light source apparatus 20 and the projector 1 can be reduced in size.

The technical scope of the present disclosure is not limited to the embodiments described above, and a variety of changes can be made thereto to the extent that the changes do not depart from the substance of the present disclosure.

For example, in the embodiments described above, the first optical layer and the second optical layer are provided at two surfaces of a single light-transmissive substrate. In place of the configuration described above, the first optical layer and the second optical layer may be provided at light-transmissive substrates different from each other. For example, the first optical layer may be provided at a first surface of a first light-transmissive substrate, an antireflection layer may be provided at a second surface of the first light-transmissive substrate that differs from the first surface, the second optical layer may be provided at a third surface of a second light-transmissive substrate, an antireflection layer may be provided at a fourth surface of the second light-transmissive substrate that differs from the third surface, and the first optical layer and the second optical layer may be disposed so as to face each other. Similarly, the third optical layer and the fourth optical layer may be provided at light-transmissible substrates different from each other.

The light source apparatuses 2 and 20 according to the embodiments described above each include the first light collector 25, the second light collector 27, and the third light collector 35. The configuration described above is, however, not necessarily employed, and at least one of the first light collector 25, the second light collector 27, and the third light collector 35 may not be provided.

The aforementioned embodiments have been described with reference to the case where a multi-emitter package structure in which the blue light emitters 213, which each emit the blue beam B, and the red light emitters 214, which each emit the red beam R, are implemented in the same package is used as the light source section 21, and the light source section 21 may instead be configured to include a first light source including the blue light emitters 213 and a second light source including the red light emitters 214 with the first light source and the second light source independent of each other.

The aforementioned embodiments have been described with reference to the case where the movable retarder 219 in the light source section 21 controls the polarization state of the blue light BL1 by adjusting the travel of the third retardation element 2191 in the direction Z, and a movable retarder configured to rotate a disk-shaped third retardation element in the optical path of the blue light BLs outputted from the light source 211 may be employed.

In each of the embodiments described above, the projector includes the homogenizer 4 including the first multi-lens 41, the second multi-lens 42, and the superimposing lens 43. In place of the configuration described above, a homogenizer having another configuration may be provided, or the homogenizer 4 may not be provided.

The light source apparatuses 2 and 20 according to the embodiments described above each output color luminous fluxes via the four light exiting positions, and the liquid crystal panel 61, which forms the light modulator 6, has the four sub-pixels SX per pixel PX. In place of the configuration described above, the light source apparatuses may each be configured to output three color luminous fluxes, and the liquid crystal panel may be configured to have three sub-pixels per pixel. In this case, for example, in each of the light source apparatuses according to the embodiments described above, a total reflection member may be provided in the optical path of the green light GLs.

The light source apparatuses 2 and 20 according to the embodiments described above each output the green light GLp1, the blue light BLp, the red light RLp1, and the green light GLp, which are each P-polarized light and are spatially separated from one another. In place of the configurations described above, the color luminous fluxes outputted by each of the light source apparatuses may each have another polarization state. For example, the light source apparatuses may each be configured to output a plurality of spatially separated color luminous fluxes that are each S-polarized light.

In addition to the above, the specific descriptions of the shape, the number, the arrangement, the material, and other factors of each component of the light source apparatus and the projector are not limited to those in the embodiments described above and can be changed as appropriate. The aforementioned embodiments have each been described with reference to the case where the light source apparatus according to the present disclosure is incorporated in a projector, but not necessarily. The light source apparatus according to any of the forms of the present disclosure may also be used as a lighting apparatus, a headlight of an automobile, and other components.

A light source apparatus according to an aspect of the present disclosure may have the configuration below.

The light source apparatus according to the aspect of the present disclosure includes a light source section that outputs first light having a first wavelength band and containing light polarized in a first polarization direction and light polarized in a second polarization direction different from the first polarization direction and second light having a second wavelength band different from the first wavelength band, a first polarization separator that transmits in a first direction the first light polarized in the first polarization direction and incident from the light source section along the first direction, reflects in a second direction intersecting the first direction the first light polarized in the second polarization direction and incident from the light source section along the first direction, and transmits in the first direction the second light incident from the light source section along the first direction, a second polarization separator that is disposed in a position shifted in the first direction from the first polarization separator, reflects in the second direction the first light polarized in the first polarization direction and incident from the first polarization separator along the first direction, and transmits in the first direction the second light incident from the first polarization separator along the first direction, a first diffusion element that is disposed in a position shifted in the second direction from the first polarization separator, diffuses the first light incident from the first polarization separator along the second direction, and emits the diffused first light in a third direction opposite the second direction, a wavelength converter that is disposed in a position shifted in the second direction from the second polarization separator, converts in terms of wavelength the first light incident from the second polarization separator along the second direction, and emits third light having a third wavelength band different from the first and second wavelength bands in the third direction, and a second diffusion element that is disposed in a position shifted in the first direction from the second polarization separator, diffuses the second light incident from the second polarization separator along the first direction, and emits the diffused second light in a fourth direction opposite the first direction. The second polarization separator receives the third light from the wavelength converter along the third direction, transmits in the third direction the third light polarized in the first polarization direction, and reflects in the fourth direction the third light polarized in the second polarization direction. The first polarization separator transmits in the third direction the first light emitted from the first diffusion element along the third direction and reflects in the third direction the third light polarized in the second polarization direction and incident from the second polarization separator along the fourth direction. The second polarization separator reflects in the third direction the second light emitted from the second diffusion element along the fourth direction.

The light source apparatus according to the aspect of the present disclosure may further include a first retardation element that is provided between the first polarization separator and the first diffusion element and on which the first light polarized in the second polarization direction is incident from the first polarization separator along the second direction.

The light source apparatus according to the aspect of the present disclosure may further include a second retardation element that is provided between the second polarization separator and the second diffusion element and on which the second light is incident from the second polarization separator along the first direction.

The light source apparatus according to the aspect of the present disclosure may further include a first mirror disposed in a position shifted in a fifth direction intersecting the first, second, third, and fourth directions from the first and second polarization separators and a second mirror provided so as to face the first mirror and disposed in a position shifted in a sixth direction opposite the fifth direction from the first and second polarization separators.

In light source apparatus according to the aspect of the present disclosure, the light source section may include a first light emitter that outputs light having the first wavelength band, a second light emitter that outputs light having the second wavelength band, and a third retardation element on which the light outputted from the first light emitter is incident and out of which the first light exits.

In the light source apparatus according to the aspect of the present disclosure, the light source section may include a substrate, the first light emitter may be mounted on the substrate, and the second light emitter may be mounted on the substrate.

The light source apparatus according to the aspect of the present disclosure may further include a first color separator that is disposed in a position shifted in the third direction from the first polarization separator and separates the light having exited out of the first polarization separator into forth light having the third wavelength band and fifth light having the first wavelength band and a second color separator that is disposed in a position shifted in the third direction from the second polarization separator and separates the light having exited out of the second polarization separator into sixth light having the second wavelength band and seventh light having the third wavelength band.

Alight source apparatus according to another aspect of the present disclosure includes a light source section that outputs first light having a first wavelength band and containing light polarized in a first polarization direction and light polarized in a second polarization direction different from the first polarization direction and second light having a second wavelength band different from the first wavelength band, a first polarization separator that transmits in a first direction the first light incident from the light source section along the first direction and reflects in a second direction intersecting the first direction the second light incident from the light source section along the first direction, a second polarization separator that is disposed in a position shifted in the first direction from the first polarization separator, transmits in the first direction the first light polarized in the first polarization direction and incident from the first polarization separator along the first direction, and reflects in the second direction the first light polarized in the second polarization direction and incident from the first polarization separator along the first direction, a wavelength converter that is disposed in a position shifted in the second direction from the second polarization separator, converts in terms of wavelength the first light polarized in the second polarization direction and incident from the second polarization separator along the second direction, and emits in a third direction opposite the second direction third light having a third wavelength band different from the first and second wavelength bands, a first diffusion element that is disposed in a position shifted in the first direction from the second polarization separator, diffuses the first light incident from the second polarization separator along the first direction, and emits the diffused first light in a fourth direction opposite the first direction, and a second diffusion element that is disposed in a position shifted in the second direction from the first polarization separator, diffuses the second light incident from the first polarization separator along the second direction, and emits the diffused second light in the third direction. The second polarization separator receives the third light from the wavelength converter along the third direction, transmits in the third direction the third light polarized in the first polarization direction, and reflects in the fourth direction the third light polarized in the second polarization direction. The first polarization separator transmits in the third direction the second light emitted from the second diffusion element along the third direction and reflects in the third direction the third light polarized in the second polarization direction and incident from the second polarization separator along the fourth direction. The second polarization separator reflects in the third direction the first light emitted from the first diffusion element along the fourth direction.

The light source apparatus according to the other aspect of the present disclosure may further include a first retardation element that is provided between the second polarization separator and the first diffusion element and on which the first light polarized in the first polarization direction is incident from the first polarization separator along the first direction.

The light source apparatus according to the other aspect of the present disclosure may further include a second retardation element that is provided between the first polarization separator and the second diffusion element and on which the second light is incident from the first polarization separator along the second direction.

The light source apparatus according to the other aspect of the present disclosure may further include a first mirror disposed in a position shifted in a fifth direction intersecting the first, second, third, and fourth directions from the first and second polarization separators and a second mirror provided so as to face the first mirror and disposed in a position shifted in a sixth direction opposite the fifth direction from the first and second polarization separators.

In light source apparatus according to the other aspect of the present disclosure, the light source section may include a first light emitter that outputs light having the first wavelength band, a second light emitter that outputs light having the second wavelength band, and a third retardation element on which the light outputted from the first light emitter is incident and out of which the first light exits.

In the light source apparatus according to the other aspect of the present disclosure, the light source section may include a substrate, the first light emitter may be mounted on the substrate, and the second light emitter may be mounted on the substrate.

The light source apparatus according to the other aspect of the present disclosure may further include a first color separator that is disposed in a position shifted in the third direction from the first polarization separator and separates the light having exited out of the first polarization separator into forth light having the second wavelength band and fifth light having the third wavelength band and a second color separator that is disposed in a position shifted in the third direction from the second polarization separator and separates the light having exited out of the second polarization separator into sixth light having the first wavelength band and seventh light having the third wavelength band.

A projector according to another aspect of the present disclosure may have the configuration below.

A projector according to the other aspect of the present disclosure includes the light source apparatus according to the aspect or the other aspect of the present disclosure, a light modulator that modulates light from the light source apparatus in accordance with image information, and a projection optical apparatus that projects the light modulated by the light modulator.

The projector according to the other aspect of the present disclosure may further include a homogenizer provided between the light source apparatus and the light modulator, and the homogenizer may include two multi-lenses that divide the light incident from the light source apparatus into a plurality of sub-luminous fluxes and a superimposing lens that superimposes the plurality of sub-luminous fluxes incident from the two multi-lenses on the light modulator.

In the projector according to the other aspect of the present disclosure, the light modulator may include a liquid crystal panel having a plurality of pixels and a microlens array provided on the light incident side of the liquid crystal panel and including a plurality of microlenses corresponding to the plurality of pixels. The plurality of pixels may each include a first sub-pixel, a second sub-pixel, a third sub-pixel, and a fourth sub-pixel. The microlenses may each cause the fourth light to be incident on the first sub-pixel, the fifth light to be incident on the second sub-pixel, the sixth light to be incident on the third sub-pixel, and the seventh light to be incident on the fourth sub-pixel.

What is claimed is:

1. A light source apparatus comprising:
   a light source section that outputs first light having a first wavelength band and containing light polarized in a first polarization direction and light polarized in a second polarization direction different from the first polarization direction and second light having a second wavelength band different from the first wavelength band;
   a first polarization separator that transmits in a first direction the first light polarized in the first polarization direction and incident from the light source section along the first direction, reflects in a second direction intersecting the first direction the first light polarized in the second polarization direction and incident from the light source section along the first direction, and transmits in the first direction the second light incident from the light source section along the first direction;
   a second polarization separator that is disposed in a position shifted in the first direction from the first polarization separator, reflects in the second direction the first light polarized in the first polarization direction and incident from the first polarization separator along the first direction, and transmits in the first direction the second light incident from the first polarization separator along the first direction;
   a first diffusion element that is disposed in a position shifted in the second direction from the first polarization separator, diffuses the first light incident from the first polarization separator along the second direction, and emits the diffused first light in a third direction opposite the second direction;
   a wavelength converter that is disposed in a position shifted in the second direction from the second polarization separator, converts in terms of wavelength the first light incident from the second polarization separator along the second direction, and emits third light having a third wavelength band different from the first and second wavelength bands in the third direction; and
   a second diffusion element that is disposed in a position shifted in the first direction from the second polarization separator, diffuses the second light incident from the second polarization separator along the first direction, and emits the diffused second light in a fourth direction opposite the first direction,
   wherein the second polarization separator receives the third light from the wavelength converter along the third direction, transmits in the third direction the third light polarized in the first polarization direction, and reflects in the fourth direction the third light polarized in the second polarization direction,
   the first polarization separator transmits in the third direction the first light emitted from the first diffusion element along the third direction and reflects in the third direction the third light polarized in the second polarization direction and incident from the second polarization separator along the fourth direction, and
   the second polarization separator reflects in the third direction the second light emitted from the second diffusion element along the fourth direction.

2. The light source apparatus according to claim 1, further comprising a first retardation element that is provided between the first polarization separator and the first diffusion element and on which the first light polarized in the second polarization direction is incident from the first polarization separator along the second direction.

3. The light source apparatus according to claim 1, further comprising a second retardation element that is provided between the second polarization separator and the second diffusion element and on which the second light is incident from the second polarization separator along the first direction.

4. The light source apparatus according to claim 1, further comprising:
   a first mirror disposed in a position shifted in a fifth direction intersecting the first, second, third, and fourth directions from the first and second polarization separators; and
   a second mirror provided so as to face the first mirror and disposed in a position shifted in a sixth direction opposite the fifth direction from the first and second polarization separators.

5. The light source apparatus according to claim 1, wherein the light source section includes a first light emitter that outputs light having the first wavelength band, a second light emitter that outputs light having the second wavelength band, and a third retardation element on which the light outputted from the first light emitter is incident and out of which the first light exits.

6. The light source apparatus according to claim 5, wherein the light source section includes a substrate, the first light emitter is mounted on the substrate, and the second light emitter is mounted on the substrate.

7. The light source apparatus according to claim 1, further comprising:
   a first color separator that is disposed in a position shifted in the third direction from the first polarization separator and separates the light that exits out of the first polarization separator into forth light having the third wavelength band and fifth light having the first wavelength band; and
   a second color separator that is disposed in a position shifted in the third direction from the second polarization separator and separates the light that exits out of the second polarization separator into sixth light having the second wavelength band and seventh light having the third wavelength band.

8. A light source apparatus comprising:
a light source section that outputs first light having a first wavelength band and containing light polarized in a first polarization direction and light polarized in a second polarization direction different from the first polarization direction and second light having a second wavelength band different from the first wavelength band;
a first polarization separator that transmits in a first direction the first light incident from the light source section along the first direction and reflects in a second direction intersecting the first direction the second light incident from the light source section along the first direction;
a second polarization separator that is disposed in a position shifted in the first direction from the first polarization separator, transmits in the first direction the first light polarized in the first polarization direction and incident from the first polarization separator along the first direction, and reflects in the second direction the first light polarized in the second polarization direction and incident from the first polarization separator along the first direction;
a wavelength converter that is disposed in a position shifted in the second direction from the second polarization separator, converts in terms of wavelength the first light polarized in the second polarization direction and incident from the second polarization separator along the second direction, and emits in a third direction opposite the second direction third light having a third wavelength band different from the first and second wavelength bands;
a first diffusion element that is disposed in a position shifted in the first direction from the second polarization separator, diffuses the first light incident from the second polarization separator along the first direction, and emits the diffused first light in a fourth direction opposite the first direction; and
a second diffusion element that is disposed in a position shifted in the second direction from the first polarization separator, diffuses the second light incident from the first polarization separator along the second direction, and emits the diffused second light in the third direction,
wherein the second polarization separator receives the third light from the wavelength converter along the third direction, transmits in the third direction the third light polarized in the first polarization direction, and reflects in the fourth direction the third light polarized in the second polarization direction,
the first polarization separator transmits in the third direction the second light emitted from the second diffusion element along the third direction and reflects in the third direction the third light polarized in the second polarization direction and incident from the second polarization separator along the fourth direction, and
the second polarization separator reflects in the third direction the first light emitted from the first diffusion element along the fourth direction.

9. The light source apparatus according to claim 8,
further comprising a first retardation element that is provided between the second polarization separator and the first diffusion element and on which the first light polarized in the first polarization direction is incident from the first polarization separator along the first direction.

10. The light source apparatus according to claim 8,
further comprising a second retardation element that is provided between the first polarization separator and the second diffusion element and on which the second light is incident from the first polarization separator along the second direction.

11. The light source apparatus according to claim 8, further comprising:
a first mirror disposed in a position shifted in a fifth direction intersecting the first, second, third, and fourth directions from the first and second polarization separators; and
a second mirror provided so as to face the first mirror and disposed in a position shifted in a sixth direction opposite the fifth direction from the first and second polarization separators.

12. The light source apparatus according to claim 8,
wherein the light source section includes a first light emitter that outputs light having the first wavelength band, a second light emitter that outputs light having the second wavelength band, and a third retardation element on which the light outputted from the first light emitter is incident and out of which the first light exits.

13. The light source apparatus according to claim 12,
wherein the light source section includes a substrate,
the first light emitter is mounted on the substrate, and
the second light emitter is mounted on the substrate.

14. The light source apparatus according to claim 8, further comprising:
a first color separator that is disposed in a position shifted in the third direction from the first polarization separator and separates the light that exits out of the first polarization separator into forth light having the second wavelength band and fifth light having the third wavelength band; and
a second color separator that is disposed in a position shifted in the third direction from the second polarization separator and separates the light that exits out of the second polarization separator into sixth light having the first wavelength band and seventh light having the third wavelength band.

15. A projector comprising:
the light source apparatus according to claim 7,
a light modulator that modulates light from the light source apparatus in accordance with image information; and
a projection optical apparatus that projects the light modulated by the light modulator.

16. The projector according to claim 15,
further comprising a homogenizer provided between the light source apparatus and the light modulator,
wherein the homogenizer includes
two multi-lenses that divide the light incident from the light source apparatus into a plurality of sub-luminous fluxes, and
a superimposing lens that superimposes the plurality of sub-luminous fluxes incident from the two multi-lenses on the light modulator.

17. The projector according to claim 16,
wherein the light modulator includes a liquid crystal panel having a plurality of pixels and a microlens array provided on a light incident side of the liquid crystal panel and including a plurality of microlenses corresponding to the plurality of pixels,
the plurality of pixels each include a first sub-pixel, a second sub-pixel, a third sub-pixel, and a fourth sub-pixel, and the microlenses each cause the fourth light to be incident on the first sub-pixel, the fifth light to be incident on the second sub-pixel, the sixth light to be incident on the third sub-pixel, and the seventh light to be incident on the fourth sub-pixel.

* * * * *